United States Patent
Wang

(10) Patent No.: US 11,059,485 B2
(45) Date of Patent: Jul. 13, 2021

(54) LANE SELECTION METHOD, TARGET VEHICLE AND COMPUTER STORAGE MEDIUM

(71) Applicant: TENCENT TECHNOLOGY (SHENZHEN) COMPANY LIMITED, Shenzhen (CN)

(72) Inventor: Bin Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 182 days.

(21) Appl. No.: 16/460,555

(22) Filed: Jul. 2, 2019

(65) Prior Publication Data
US 2019/0322281 A1 Oct. 24, 2019

Related U.S. Application Data

(63) Continuation of application No. PCT/CN2018/081187, filed on Mar. 29, 2018.

(30) Foreign Application Priority Data

Apr. 20, 2017 (CN) .......................... 201710262939.9

(51) Int. Cl.
*B60W 30/18* (2012.01)
*B60W 30/14* (2006.01)
(Continued)

(52) U.S. Cl.
CPC .... B60W 30/18163 (2013.01); B60W 30/146 (2013.01); G01C 21/3658 (2013.01);
(Continued)

(58) Field of Classification Search
CPC ......... B60W 30/146; B60W 30/18163; B60W 2555/60; B60W 2554/4042;
(Continued)

(56) References Cited

U.S. PATENT DOCUMENTS

2005/0015203 A1* 1/2005 Nishira .................. G08G 1/167
701/301
2007/0225914 A1* 9/2007 Kawazoe .............. B60W 30/12
701/301
(Continued)

FOREIGN PATENT DOCUMENTS

AU    2017100399 A4 *  5/2017  ....... G08G 1/096811
CN       103065501 A     4/2013
(Continued)

OTHER PUBLICATIONS

International Search Report dated Jul. 4, 2018 in PCT/CN2018/081187, with English translation, citing documents AI-AL therein.
(Continued)

*Primary Examiner* — Atul Trivedi
(74) *Attorney, Agent, or Firm* — Oblon, McClelland, Maier & Neustadt, L.L.P.

(57) ABSTRACT

A method and an apparatus for lane selection are provided. In the disclosed method that is implemented by the apparatus, a decision model used for a lane change selection is obtained based on a first model configured to decide a junction lane change and a second model configured to decide a travelling speed. In addition, travelling information of a target vehicle and target information related to the target vehicle is acquired in real time. The target information is configured to represent travelling information of one or more vehicles around the target vehicle. A target lane is subsequently defined based on the decision model, the target information related to the target vehicle and the travelling information of the target vehicle that is acquired in real time.

20 Claims, 9 Drawing Sheets

(51) Int. Cl.
*G01C 21/36* (2006.01)
*G08G 1/16* (2006.01)

(52) U.S. Cl.
CPC ....... *G08G 1/167* (2013.01); *B60W 2554/804* (2020.02); *B60W 2555/60* (2020.02)

(58) Field of Classification Search
CPC ....... B60W 2554/80; B60W 2554/804; B60W 2050/0085; G08G 1/096725; G08G 1/167; G01C 21/3658
USPC .......................................................... 701/23
See application file for complete search history.

(56) References Cited

U.S. PATENT DOCUMENTS

| | | | |
|---|---|---|---|
| 2008/0161986 A1* | 7/2008 | Breed ..................... G01S 19/48 | |
| | | | 701/23 |
| 2015/0039278 A1 | 2/2015 | Hale | |
| 2015/0235556 A1 | 8/2015 | Gordon | |
| 2015/0312327 A1* | 10/2015 | Fowe ....................... B60R 1/00 | |
| | | | 701/23 |
| 2017/0043780 A1 | 2/2017 | Yoon | |
| 2017/0153639 A1* | 6/2017 | Stein ................. G06K 9/00805 | |
| 2017/0227966 A1* | 8/2017 | Monzen ............ B62D 15/0255 | |
| 2017/0364083 A1 | 12/2017 | Yang et al. | |
| 2019/0071091 A1* | 3/2019 | Zhu ................. B60W 30/18163 | |
| 2019/0171206 A1* | 6/2019 | Abrams ............. G01C 21/3461 | |
| 2019/0276017 A1* | 9/2019 | Hardy ................ G08G 1/09623 | |
| 2019/0315345 A1* | 10/2019 | Newman ............... B60W 50/14 | |
| 2019/0333381 A1* | 10/2019 | Shalev-Shwartz .... B60W 30/09 | |
| 2019/0347821 A1* | 11/2019 | Stein ...................... G01C 21/28 | |
| 2019/0367021 A1* | 12/2019 | Zhao ............... B60W 60/00274 | |
| 2019/0381914 A1* | 12/2019 | Kaneko .................... A47C 3/02 | |
| 2020/0242924 A1* | 7/2020 | Publicover ............. G08G 1/147 | |
| 2020/0257301 A1* | 8/2020 | Weiser ................. G05D 1/0214 | |
| 2020/0264900 A1* | 8/2020 | Cheriton ......... B60W 30/18163 | |
| 2021/0110484 A1* | 4/2021 | Shalev-Shwartz .......................... | |
| | | | B60W 30/0956 |

FOREIGN PATENT DOCUMENTS

| | | | | |
|---|---|---|---|---|
| CN | 103996287 A | | 8/2014 | |
| CN | 103871242 B | | 9/2015 | |
| CN | 105160917 A | | 12/2015 | |
| CN | 105206052 A | | 12/2015 | |
| CN | 105580009 A | | 5/2016 | |
| CN | 103348392 B | | 6/2016 | |
| CN | 103781685 B | | 8/2016 | |
| CN | 106114507 A | | 11/2016 | |
| CN | 106327896 A | | 1/2017 | |
| CN | 107792073 A | * | 3/2018 | ........ B60W 60/0015 |
| CN | 111038507 A | * | 4/2020 | .......... G05D 1/0257 |
| JP | 2001-93098 A | | 4/2001 | |
| JP | 2003-157500 A | | 5/2003 | |
| JP | 2016-215790 A | | 12/2016 | |
| TW | 1270827 A | | 1/2007 | |
| TW | 201007136 A | | 2/2010 | |
| WO | WO-2015156146 A1 | * | 10/2015 | ............ B60W 30/12 |

OTHER PUBLICATIONS

Written Opinion dated Jul. 4, 2018 in PCT/CN2018/081187, citing document AI.
Office Action dated Feb. 28, 2019 in Chinese Patent Application No. 201710262939.9, with partial English translation, citing documents AA and AI-AM therein.
Office Action dated Apr. 15, 2019 in Taiwanese Patent Application No. 107112473, citing documents AA and AM-AT therein.
Office Action dated Jun. 29, 2020 in Korean Patent Application No. 10-2019-7023464 with English translation.
Extended European Search Report dated Apr. 24, 2020 in Patent Application No. 18787339.3.
Office Action dated May 12, 2020 in European Patent Application No. 18787339.3.

* cited by examiner

LANE SELECTION METHOD, TARGET VEHICLE AND COMPUTER STORAGE MEDIUM

RELATED APPLICATION

This application is a continuation of International Application No. PCT/CN2018/081187, filed on Mar. 29, 2018 which claims priority to Chinese Patent Application No. 201710262939.9, filed on Apr. 20, 2017. The entire disclosures of the prior application are hereby incorporated by reference in their entirety.

FIELD OF THE TECHNOLOGY

The present disclosure relates to a road selection technology and in particular, to a lane selection method, a target vehicle and a computer storage medium.

BACKGROUND OF THE DISCLOSURE

In a vehicle travelling process, a driver selects a most proper lane to perform travelling. However, in an unmanned driving scenario (or referred to as an unmanned driving vehicle travelling scenario), only when a vehicle has the same capability of autonomously selecting an optimal lane during self-driving as that of a driver, the vehicle can travel on a multi-lane expressway or city road; otherwise, the vehicle cannot set out on a journey. A difference between the two is that an autonomous driving process of a user is semi-automatic, and after an automatic navigation path is pre-estimated, a judgment of the user may be added, and therefore, a long response time may be allowed; while unmanned driving is full-automatic, no excessively long response time is allowed, and it needs to be ensured that a response time is as short as possible. In the unmanned driving scenario, selection of an optimal lane is related to lane change motions of changing a lane that includes discretionary lane change (DLC) and mandatory lane change (MLC). The DLC is used to improve a travelling speed, and the MLC means that because of impact from a junction or the like, departure from a current lane is required.

In the related example, whether the MLC needs to be considered needs to be first judged, and the DLC is then considered after a particular condition is met, in order to simulate a driving motion of a driver by using this judgment mechanism. However a problem of this judgment mechanism is that the judgment mechanism in which analysis is performed by separating the DLC from the MLC has a relatively large difference from the unmanned driving scenario, especially in lane change selection. A decision result based on the judgment mechanism is not ideal during actual application, and precise lane change selection cannot be implemented as a result, a requirement for an as short as possible response time cannot be ensured.

In the related technology there has been no effective solution to the problem.

SUMMARY

In view of this embodiments of the present disclosure provide a lane selection method, a target vehicle and a computer storage medium to resolve at least the problem existing in the related examples.

According to an aspect of the disclosure, a method and an apparatus for lane selection are provided. In the disclosed method that is implemented by the apparatus for example, a decision model used for a lane change selection is obtained based on a first model configured to decide a junction lane change and a second model configured to decide a travelling speed. In addition, travelling information of a target vehicle and target information related to the target vehicle is acquired in real time. The target information is configured to represent travelling information of one or more vehicles around the target vehicle. A target lane is subsequently defined based on the decision model, the target information related to the target vehicle, and the travelling information of the target vehicle that is acquired in real time.

In the disclosed method, utility values of candidate lanes associated with the target vehicle are calculated based on the decision model, the target information related to the target vehicle, and the travelling information of the target vehicle that is acquired in real time. A lane having a maximum utility value from the calculated utility values can be defined as the target lane.

In some embodiments, candidate lanes includes at least one of a current lane on which the target vehicle is currently travelling, a left lane with respect to the current lane, and a right lane with respect to the current lane. The left and right lanes are adjacent to the target vehicle.

In the disclosed method, a respective first utility value can be determined for each of the candidate lanes according to a value of lane change times of the target vehicle, a distance from the target vehicle to a junction, and a minimum distance for each of lane changes of the target vehicle. The respective first utility value for each of the candidate lanes is related to the first model. In addition, a respective second utility value for each of the candidate lanes can be determined according to speed information of the candidate lanes and speed limit information of the candidate lanes. The respective second utility value for each of the candidate lanes is related to the second model. The speed information of the candidate lanes includes a recommended speed limit to the target vehicle in the candidate lanes. Further, a respective comprehensive utility value for each of the candidate lanes can be obtained according to the respective first utility value and the respective second utility value for each of the candidate lanes.

In the disclosed method, before the respective first utility value for each of the candidate lanes is determined, a first candidate lane can be determined from the candidate lanes according to a road network condition, where the road network condition includes the junction and a subsequent road connected to the junction. A first value of lane change times of the target vehicle can also be obtained according to a first distance between the current lane on which the target vehicle is currently travelling and the first candidate lane in a first direction. The first direction is perpendicular to the current lane and the first candidate lane. Further, the distance from the target vehicle to the junction can be obtained according to a second distance between a location of the current lane on which the target vehicle is currently located and the junction in a second direction, where the second direction is parallel to the current lane. According to a current speed and an estimated lane change time of the target vehicle, the minimum distance can be obtained for each of the lane changes.

In the disclosed method, before the respective second utility value for each of the candidate lanes is determined, a speed of the target vehicle in real time can be calculated and adjusted according to speed information of the one or more vehicles around the target vehicle. The speed information of the current lane can be obtained according to a preset rule when a vertical distance from a center point of the target vehicle to a center line of the current lane is less than a threshold value.

In some embodiments, a minimum speed of two or more vehicles in the current lane is applied as the speed information of the current lane when the two or more vehicles are detected on the current lane, where the two or more vehicles include the target vehicle. In some embodiments, the speed limit information of the current lane is defined as the speed information of the current lane when only the target vehicle exists in the current lane. In the disclosed method, other vehicles behind the target vehicle on the current lane are ignored when the speed information of the current lane is obtained according to the preset rule.

In some embodiments, a modification on the speed information of current lane can be performed by multiplying the speed information of the current lane with an adjustment coefficient when three or more lanes exist and the current lane is a fast lane. Accordingly, a second utility value of the current lane can be determined according to the modified speed information and the speed limit information of the current lane.

According to another aspect, a non-transitory computer readable storage medium is provided. The medium stores instructions which when executed by at least one processors cause the at least one processor to perform any of the methods for invitation behavior prediction which are mentioned above.

Through the embodiments of the present disclosure, modeling is performed according to models used to represent different decision choices, in order to obtain a decision model that is used for lane change selection. For example, decision results that are obtained by performing modeling through the DLC and the MLC enable all impact conditions, such as a speed and a junction, to be comprehensively considered in an unmanned driving scenario, which better meets an actual requirement. In the disclosure, a target lane is obtained through the decision model, and according to the target information related to the target vehicle and the travelling information of the target vehicle that are obtained in real time. Lane selection is performed according to the obtained target lane to implement precise lane change selection so that it can be ensured that a response time is as short as possible.

BRIEF. DESCRIPTION OF THE DRAWINGS

DESCRIPTION OF EMBODIMENTS

Figure 1:
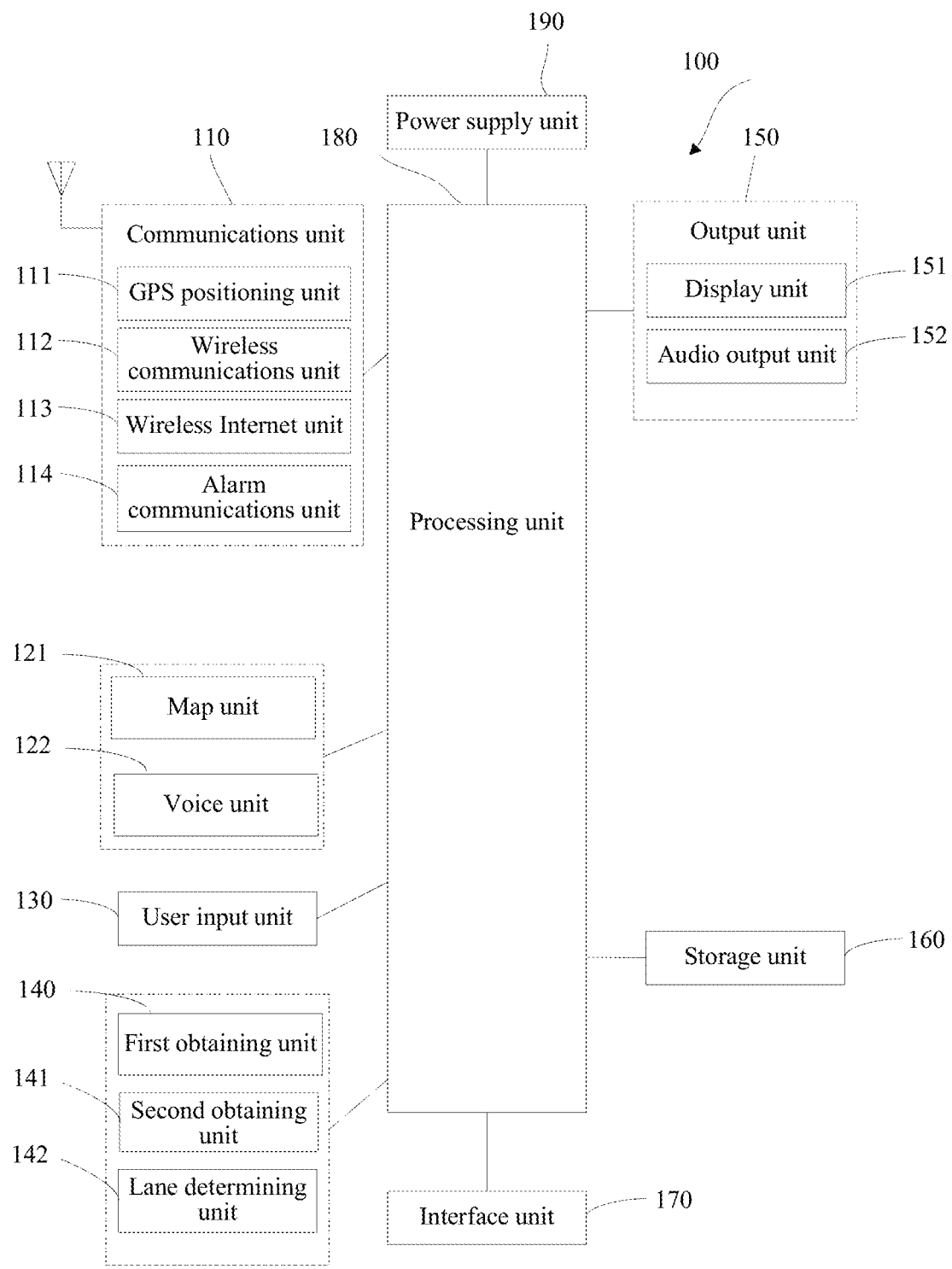
FIG. 1 is a schematic diagram of an optional hardware structure of an in-vehicle terminal that is installed on a target vehicle or a mobile terminal held by a user for implementing each embodiment of the present disclosure.

Implementation of technical solutions is further described in detail below with reference to the accompanying drawings.

A mobile terminal implementing each embodiment of the present disclosure is described with reference to the accompanying drawings. In subsequent description, a suffix such as "module" "component" or "unit" used to indicate an element is used to only facilitate descriptions of the embodiments of the present disclosure and has no particular meaning. Therefore "module" and "component" may be used in a mixed manner.

Numerous specific details are stated in the following detailed description so as to thoroughly understand the present disclosure. However, a person of ordinary skill in the art may obviously practice the present disclosure without these specific details. In other cases a disclosed well-known method process component circuit and network are not described in detail so as to prevent each aspect of the embodiments from being unnecessarily made unclear.

Additionally, herein, although terms such as "first" and "second" are used for a plurality of times to describe various elements (various thresholds, various applications, various instructions or various operations) and the like, these elements (thresholds, applications, instructions or operations) should be not limited by these terms. These terms are used to only distinguish an element (threshold, application, instruction or operation) and another element (threshold application instruction or operation). For example, a first operation may be referred to as a second operation or a second operation may be referred to as a first operation without departing from the scope of the present disclosure. Both the first operation and the second operation are operations but just the two are not the same operation.

Steps in the embodiments of the present disclosure are unnecessarily processed according to a described step order, the steps may be selectively disorganized and rearranged according to a requirement a step in the embodiments is deleted, or a step is added to an embodiment. Step descriptions in the embodiments of the present disclosure are only an optional order combination and do not represent all step order combinations of the embodiments of the present disclosure, and a step order in the embodiments cannot be considered as a limitation on the present disclosure.

A term "and/or" in the embodiments of the present disclosure means including any possible combination and all possible combinations of one or more associated listed items. It should be further noted that "include/include" when used in this specification specifies the presence of stated features, integers, steps, operations, elements, and/or components, but does not preclude the presence or addition of one or more other features, integers, steps, operations, elements, components, and/or groups thereof.

A "target vehicle" herein is a self-driving automobile in an unmanned driving scenario, which may be alternatively referred to as self-vehicle.

An intelligent terminal (for example, a mobile terminal) in the embodiments of the present disclosure may be implemented in various forms. For example, a mobile terminal described in the embodiments of the present disclosure may include mobile terminals, such as a mobile phone, a smartphone, a notebook computer, a digital broadcast receiver, a personal digital assistant (PDA), a pad computer (PAD), a portable media player (PMP) and a navigation apparatus, and fixed terminals such as a digital TV and a desktop computer. Below, it is assumed that a terminal is a mobile terminal. However, a person skilled in the art will understand that in addition to an element that is particularly used for a mobile objective, a structure according to an implementation of the present disclosure can also be applied to a fixed terminal.

FIG. 1 is a schematic diagram of an optional hardware structure of a mobile terminal for implementing embodiments of the present disclosure. The mobile terminal 100 is not limited to an in-vehicle terminal or a mobile phone terminal. In this embodiment, the mobile terminal is placed in a target vehicle.

When being an in-vehicle terminal, the mobile terminal 100 may include a GPS positioning unit 111, a wireless communications unit 112, a wireless Internet unit 113, an alarm communications unit 114, a map unit 121, a voice unit 122, a user input unit 130, a first obtaining unit 140, a second obtaining unit 141, a lane determining unit 142, an output unit 150, a display unit 151, an audio output unit 152, a storage unit 160, an interface unit 170, a processing unit 180, a power supply unit 190, and the like. FIG. 1 shows the mobile terminal having various components. But it should be understood that not all shown components are required to be implemented. More or fewer components can be alternatively implemented. Elements of the in-vehicle terminal are described below in detail.

The GPS positioning unit 111 is configured to receive information transmitted by a satellite so as to check or obtain location information of the in-vehicle terminal, for example, perform single-satellite positioning, dual-satellite positioning or the like, according to the transferred information so as to determine a location of a vehicle relative to a navigation path, e.g. a location of a lane on a navigation path or the like. Specifically, distance information from three or more satellites and accurate time information are calculated, and a triangle measurement method is applied to the calculated information, thereby accurately calculating three-dimensional current location information according to a longitude a latitude and a height. Currently three satellites are used for a method for calculating location information and time information, and another satellite is used to correct errors of the calculated location information and time information. Moreover, the GPS positioning unit 111 can further calculate speed information by continuously calculating current location information in real time to obtain speed information of the current vehicle.

The wireless communications unit 112 allows radio communication between the in-vehicle terminal and a wireless communications system or network. For example, the wireless communications unit performs communication in diversified forms. The wireless communications unit may communicate and interact with a background server in a broadcast form, a Wi-Fi communications form, a mobile communications (2G, 3G or 4G) form, or the like. When communicating and interacting in the broadcast form, the wireless communications unit may receive a broadcast signal and/or broadcast-related information from an external broadcast management server through a broadcast channel. The broadcast channel may include a satellite channel and/or a ground channel. The broadcast management server may be a server generating and sending the broadcast signal and/or the broadcast-related information, or a server receiving a broadcast signal and/or broadcast-related information previously generated and sending the broadcast signal and/or the broadcast-related information to a terminal. The broadcast signal may include a TV broadcast signal, a radio broadcast signal, a data broadcast signal, and the like. Moreover, the broadcast signal may further include a broadcast signal combined with a TV or radio broadcast signal. The broadcast-related information may alternatively be provided through a mobile communications network. The broadcast signal may exist in various forms, for example, may exist in such a form as a digital multimedia broadcasting (DMB) electronic program guide (EPG) or a digital video broadcasting-handheld (DVB-H) electronic service guide (ESG). The broadcast signal and/or broadcast-related information may be stored in the storage unit 160 (or another type of storage medium). Wi-Fi is a technology that can connect terminals, such as a personal computer and a mobile terminal (e.g., an in-vehicle terminal or a mobile phone terminal) to each other in a wireless manner. When a Wi-Fi communications form is used, a Wi-Fi hotspot can be accessed and then a Wi-Fi network is accessed. The Wi-Fi hotspot may be created by installing an access point on an Internet connection. This access point transmits a radio signal through a short range and usually covers 300 feet. When the in-vehicle terminal supporting Wi-Fi encounters a Wi-Fi hotspot, a connection to a Wi-Fi network can be made in a wireless manner. When the mobile communications (2G, 3G or 4G) form is used, a radio signal is sent to and/or a radio signal is received from at least one of a base station (for example, an access point or a NodeB), an external terminal, and a server. Such a radio signal may include a voice call signal, a video call signal, or various types of data sent and/or received according to a text message and/or a multimedia message.

The wireless Internet unit 113 supports various data transmission communications technologies of the in-vehicle terminal including a wireless data transmission communications technology, so as to access the Internet. The unit may be internally or externally coupled to the in-vehicle terminal. Wireless Internet access technologies that is related to the unit may include wireless local area network (WLAN), wireless broadband (Wibro), Worldwide Interoperability for Microwave Access (Wimax), High Speed Downlink Packet Access (HSDPA), and the like.

The alarm communications unit 114 is configured to send an alarm signal to the background server to report vehicle abnormity information. Specifically, current vehicle location information obtained through the GPS positioning unit and the vehicle abnormity information are packetized together and transmitted to the background server, such as an alarm or monitoring center for processing. The map unit 121 is configured to store map information, where the map information may be map information used offline after being downloaded online, and may alternatively be map information downloaded in real time. The map information may be further updated in time. The voice unit 122 is configured to perform a voice operation. The voice unit may receive a voice command of a user. The voice unit may perform voice broadcast with reference to (i) the current vehicle location, (ii) navigation information, (iii) and a background processing result of the vehicle abnormity information to remind the user to pay attention to a road condition and the like.

2G, 3G, 4G, a wireless technology or the like, may be applied to the in-vehicle terminal to support high-speed data transmission and transfer sound and data information. Based on an open interface and various applications, the in-vehicle terminal can be used in cooperation with various I/O devices more easily.

The user input unit 130 may generate key input data according to a command input by the user to control various operations of the in-vehicle terminal. The user input unit 130 allows the user to input various types of information and may include a keyboard, a mouse, a touchpad (e.g., a contact-sensitive component for detecting a change in resistance, pressure, capacitance, or the like, which is caused by a touch), a scroll wheel, a joystick and the like. Particularly, when the touchpad is superposed on the display unit 151 in a layer form, a touch screen may be formed.

The first obtaining unit 140 is configured to obtain a decision model used for lane change selection according to a first model that is used to decide junction lane change, and a second model used to decide a travelling speed; the second obtaining unit 141 is configured to obtain travelling information of a target vehicle and target information related to the target vehicle in real time, the target information being used to represent travelling information of a vehicle around the target vehicle; and the lane determining unit 142 is configured to obtain a target lane through the decision model and according to the target information and the travelling information of the target vehicle that are obtained in real time.

The interface unit 170 is used as an interface through which at least one external apparatus may be connected to the in-vehicle terminal. For example, the external apparatus may include a wired or wireless headphone port, an external power supply (or battery charger) port, a wired or wireless data port, a memory card port, a port used to connect to an apparatus having an identification unit, an audio input/output (I/O) port, a video I/O port, a headset port and the like. The identification unit may store various information that is used to verify the in-vehicle terminal used by the user, and may include a user identity module (UIM), a subscriber identity module (SIM), a universal subscriber identity module (USIM) and the like. Additionally, the apparatus having the identification unit (referred to as "identification apparatus" below) may take a form of a smart card and therefore, the identification apparatus may be connected to the in-vehicle terminal through a port or another connection apparatus. The interface unit 170 may be configured to receive an input from the external apparatus (e.g., data information or power) and transmit the received input to one or more elements in the in-vehicle terminal, or may be configured to transmit data between the in-vehicle terminal and the external apparatus.

Additionally, when the in-vehicle terminal is connected to an external base, the interface unit 170 may be used as a path through which power is allowed to be provided from the base to the in-vehicle terminal, or may be used as a path through which various command signals input from the base are allowed to be transmitted to the in-vehicle terminal. Various command signals or power input from the base may be used as a signal used to identify whether the in-vehicle terminal is accurately installed on the base. The output unit 150 is constructed to provide an output signal (e.g., an audio signal a video signal or a vibration signal) in a visual audio and/or tactile manner. The output unit 150 may include the display unit 151, the audio output unit 152, and the like.

The display unit 151 may display information processed in the in-vehicle terminal. For example, the in-vehicle terminal may display a related user interface (UI) or a graphical user interface (GUI). When the in-vehicle terminal is in a video call mode or an image capture mode, the display unit 151 may display a captured image and/or a received image and show a video or an image, a UI or GUI of a related function or the like.

Moreover, when the display unit 151 and the touchpad are superposed in a layer form to form a touch screen, the display unit 151 may be used as an input apparatus and an output apparatus. The display unit 151 may include at least one of a liquid crystal display (LCD), a thin film transistor LCD (TFT-LCD), an organic light-emitting diode (OLED) display, a flexible display, a three-dimensional (3D) display, and the like. Some of these displays may be constructed into a transparent shape to allow the user to watch from outside and may be referred to as transparent displays, and a typical transparent display may be, for example, a transparent organic light-emitting diode (TOLED) display. According to a particularly intended implementation, the in-vehicle terminal may include two or more display units (or other display apparatuses), for example, the in-vehicle terminal may include an external display unit (not shown) and an internal display unit (not shown). The touch screen may be configured to detect a touch input pressure, a touch input location and a touch input area.

When the in-vehicle terminal is in a mode such as a call signal receiving mode, a call mode, a recording mode, a speech recognition mode, or a broadcast receiving mode, the audio output unit 152 may convert received audio data or audio data stored in the storage unit 160 into an audio signal and output the audio signal as a sound. Moreover, the audio output unit 152 may provide an audio output (e.g., a call signal receiving sound or a message receiving sound) related to a particular function performed by the in-vehicle terminal. The audio output unit 152 may include a speaker a buzzer and the like.

The storage unit 160 may store a software program for processing and control operations performed by the processing unit 180, and the like, or may temporarily store output data or to-be-output data (for example, an address book a message a static image or a video). Moreover, the storage unit 160 may store data about various vibration and audio signals that are outputted when a touch is applied to the touch screen.

The storage unit 160 may include at least one type of storage medium, and the storage medium includes a flash memory, a hard disk, a multimedia card, a card memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. Moreover, the in-vehicle terminal may cooperate with a network storage apparatus for performing a storage function of the storage unit 160 through a network connection.

The processing unit 180 usually controls an overall operation of the in-vehicle terminal. For example, the processing unit 180 performs control and processing that are related to a voice call, data communication, a video call, and the like. For another example the processing unit 180 may perform mode identification processing so as to identify a handwriting input or picture drawing input that is performed on the touch screen as a character or an image.

Under control of the processing unit 180, the power supply unit 190 receives external power or internal power and provides proper power required for operating elements and components.

Various implementations described herein may be implemented by using, for example, computer software, hardware or a computer readable medium of any combination thereof. For hardware implementation, the implementation described herein may be implemented by using at least one of an application-specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit that is designed to perform the function described herein. In some cases, such an implementation may be implemented in the processing unit 180. For a software implementation, an implementation such as a process or a function may be implemented by using an independent software unit allowed to perform at least one function or operation. Software code may be implemented by using a software application program (or program) compiled in any proper programming language and the software code may be stored in the storage unit 160 and executed by the processing unit 180. A specific hardware entity of the storage unit 160 may be a memory, and a specific hardware entity of the processing unit 180 may be a controller.

So far, the foregoing unit formation structure in the mobile terminal represented by the in-vehicle terminal has been described according to functions thereof.

The mobile terminal 100 shown in FIG. 1 may be constructed to be operated by using, for example, wired and wireless communications systems for sending data through a frame or a packet and a satellite-based communications system.

A communications system that can be operated by the mobile terminal 100 according to this embodiment of the present disclosure is described with reference to FIG. 2.

Such a communications system may use different air interfaces and/or physical layers. For example, the air interfaces used by the communications system include, for example, frequency division multiple access (FDMA), time division multiple access (TDMA), code division multiple access (CDMA), universal mobile telecommunications system (UMTS) (particularly, long term evolution (LTE)), global system for mobile communications (GSM) and the like. As a non-limiting example the following description is related to a CDMA communications system but such a teaching is likewise applicable to another type of system.

Figure 2:
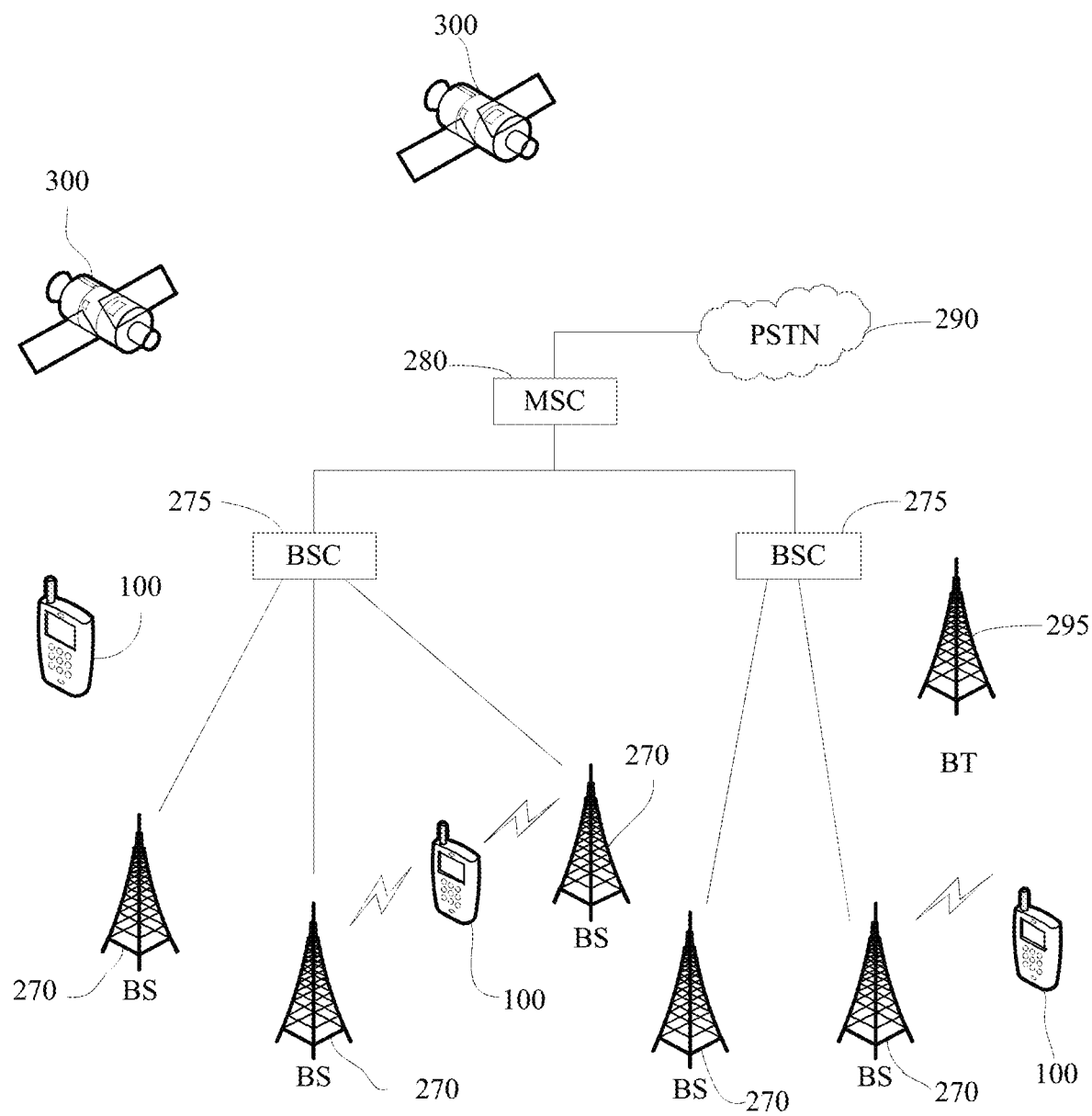
FIG. 2 is a schematic diagram of a communications system of the mobile terminal shown in FIG. 1.

Referring to FIG. 2, a CDMA wireless communications system may include a plurality of mobile terminals 100, a plurality of base stations (BS) 270, a base station controller (BSC) 275, and a mobile switching center (MSC) 280. The MSC 280 is constructed to form an interface with a public switched telephone network (PSTN) 290. The MSC 280 is further constructed to form an interface with the BSC 275 that may be coupled to the BS 270 through a backhaul. The backhaul may be constructed according to any one of several known interfaces and the interface includes, for example, E1/T1, ATM, IP, PPP, frame relay HDSL, ADSL or xDSL. It should be understood that the system shown in FIG. 2 may include a plurality of BSCs 275.

Each BS 270 may serve one or more partitions (or areas), and each partition covered by a multi-directional antenna or an antenna pointing to a particular direction that is away from the BS 270 in a radial shape. Alternatively, each partition may be covered by two or more antennas used for diversity reception. Each BS 270 may be constructed to support a plurality of frequency assignments and each frequency assignment has a particular frequency spectrum (for example, 1.25 MHz or 5 MHz).

A cross between a partition and a frequency assignment may be referred to as a CDMA channel. The BS 270 may alternatively be referred to as a base transceiver station (BTS) or another equivalent term. In such a case, the term "base station" may be used to generally indicate a single BSC 275 and at least one BS 270. The base station may alternatively be referred to as a "cellular station". Alternatively partitions of a particular BS 270 may be referred to as a plurality of cellular stations.

As shown in FIG. 2, a broadcast transmitter (BT) 295 sends a broadcast signal to the mobile terminal 100 operated in the system. A broadcast receiving unit 111 shown in FIG. 1 is configured to receive the broadcast signal sent by the BT 295 at the mobile terminal 100. FIG. 2 shows several satellites 300. For example, a global positioning system (GPS) satellite 300 may be used. The satellite 300 assists in positioning at least one of the plurality of mobile terminals 100.

FIG. 2 shows a plurality of satellites 300. However, it should be understood by one of ordinary skill in the art that any quantity of satellites may be used to obtain useful positioning information. The location information unit 115 shown in FIG. 1 is usually constructed to cooperate with the satellite 300 to obtain intended positioning information. In place of a GPS tracking technology, or in addition to a GPS tracking technology, another technology that can track a location of a mobile terminal may be used. Additionally, at least one GPS satellite 300 may selectively or additionally process satellite DMB transmission.

As a typical operation of the wireless communications system, the BS 270 receives reverse link signals from various mobile terminals 100. The mobile terminal 100 usually participates in a call message reception/transmission and another type of communication. Each reverse link signal received by a particular base station is processed in the particular BS 270. Obtained data is forwarded to the related BSC 275. The BSC provides call resource assignment and a mobile management function including coordination of a soft switching process between the BSs 270. The BSC 275 further routes the received data to the MSC 280 that provides an additional routing service used to form an interface with the PSTN 290. Similarly the PSTN 290 forms an interface with the MSC 280, the MSC forms an interface with the BSC 275, and the BSC 275 correspondingly controls the BS 270 to send a forward link signal to the mobile terminal 100.

A mobile communications unit 112 of a communications unit 110 in the mobile terminal accesses, based on necessary data (including user identity information and authentication information) of an access mobile communications network (for example, a mobile communications network such as 2G/3G/4G) built in the mobile terminal, the mobile communications network to transmit mobile communication data (including uplink mobile communication data and downlink mobile communication data) for a service of a user of the mobile terminal, such as web page browsing or network multimedia playing.

The wireless Internet unit 113 of the communications unit 110 implements a function of a wireless hotspot by running a related protocol function of the wireless hotspot and the wireless hotspot supports access of a plurality of mobile terminals (other mobile terminals than the mobile terminal) and transmits, by reusing a mobile communication connection between the mobile communications unit 112 and the mobile communications network mobile communication data (including uplink mobile communication data and downlink mobile communication data) for a service of a user of the mobile terminal, such as web page browsing or network multimedia playing. The mobile terminal substantially transmits mobile communication data by reusing a mobile communication connection between the mobile terminal and the communications network therefore, traffic of the mobile communication data consumed by the mobile terminal is charged to communication tariff of the mobile terminal by a charging entity on a communications network side, thereby consuming data traffic of mobile communication data included in communication tariff that the mobile terminal subscribes to use.

Figure 3:
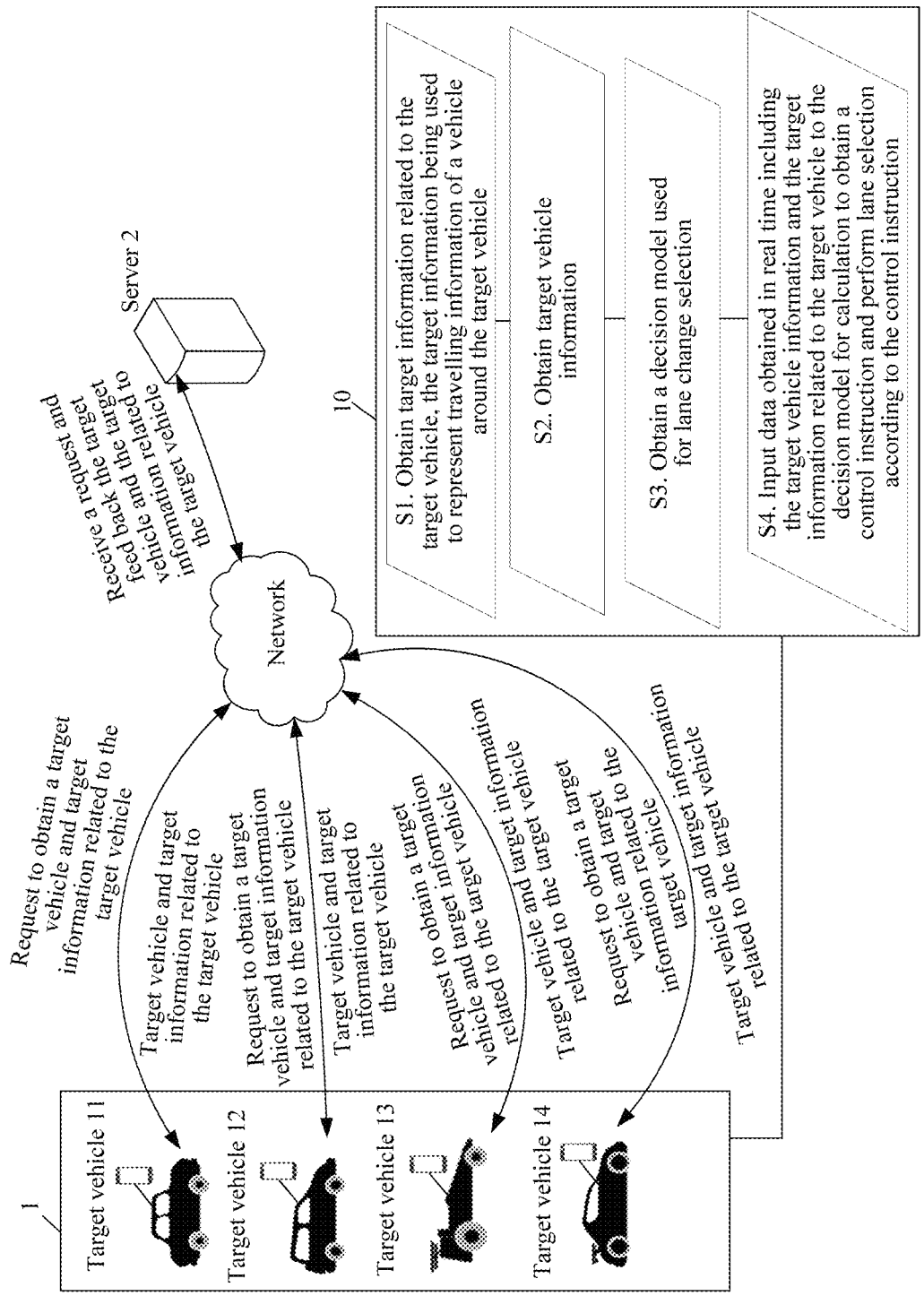
FIG. 3 is a schematic diagram of hardware entities performing information exchange according to an embodiment of the present disclosure.

FIG. 3 is a schematic diagram of hardware entities performing information exchange according to an embodiment of the present disclosure. FIG. 3 includes a terminal device 1 and a server 2. The terminal device 1 consists of terminal devices 11 to 14, and the terminal device performs information exchange with the server through a wired network or a wireless network. The terminal device may be an in-vehicle terminal installed on a target vehicle or a mobile terminal held by a user. The terminal device is configured on a travelling vehicle, and the terminal device may be configured on each vehicle so as to exchange data with a background server through the terminal device to obtain various types of control information that is used for unmanned driving. A difference between self-driving and unmanned driving needs to be first specified. An autonomous driving process of a user is semi-automatic, and after an automatic navigation path is pre-estimated, a judgment of the user may be added and therefore a quite long response time may be allowed. While unmanned driving is full-automatic, and no excessively long response time is allowed, and it needs to be ensured that a response time is as short as possible. In the unmanned driving scenario, selection of an optimal lane is related to lane change motions of changing a lane, including DLC and MLC. The DLC is used to improve a travelling speed, and the MLC means that because of impact from a junction or the like, departure from a current lane when the departure is required. For example, whether the MLC needs to be considered needs to be first judged, and the DLC is then considered after a particular condition is met in order to simulate a driving motion of a driver by using this judgment mechanism. However a problem existing in this judgment mechanism is in the judgment mechanism in which analysis is performed by separating the DLC from the MLC, the two models namely, the DLC and the MLC are completely separated. On one hand, transition of scenario switching is insufficiently natural, and a case in which last lane change to left has not been performed, but next lane change to right is decided may occur. That is compared with an unmanned driving scenario to be discussed in this embodiment, this existing judgment mechanism has a relatively large difference, particularly in lane change selection that cannot ensure a requirement that a response time is as short as possible and is not applicable to the unmanned driving scenario. On the other hand, a decision result based on the judgment mechanism is affected greatly by a current speed of a vehicle during actual application, and the result is insufficiently stable. For example, when the speed slightly changes, a back-and-forth switching case may occur as a result, precise lane change selection cannot be implemented, and the requirement that a response time is as short as possible cannot be ensured either. Moreover, this existing judgment mechanism equally processes all lanes and requirements, such as overtaking from a left lane cannot be used.

Based on this embodiment of the present disclosure, processing logic 10 of the terminal device is shown in FIG. 3, and the processing logic 10 includes the following steps. S1. Obtain target information related to the target vehicle, the target information being used to represent travelling information of a vehicle around the target vehicle. S2. Obtain target vehicle information. S3. Obtain a decision model used for lane change selection according to a first model used to decide junction lane change and a second model used to decide a travelling speed. S4. Input data obtained in real time, including the target vehicle information and the target information related to the target vehicle, for example, information of a current vehicle and information of a vehicle related to the current vehicle, to the decision model for calculation to obtain a control instruction and perform lane selection according to the control instruction.

It can be learned that used calculation logic may generate process and perform corresponding process in the in-vehicle terminal installed on the target vehicle or the mobile terminal held by the user. The server is configured to provide various data sources required by the target vehicle, which includes the current vehicle and another vehicle related to the current vehicle. The data may be stored in the in-vehicle terminal installed on the target vehicle or the mobile terminal held by the user, and lane selection is performed through the control instruction. This embodiment of the present disclosure is not limited to the scenario that the calculation logic is in the server, where, after receiving a request, the server performs the calculation logic and delivers the control instruction to the vehicle in real time to perform lane selection, according to the control instruction. However because of a plurality of risks of network interaction if the calculation logic is placed in the server, a response time in the unmanned driving scenario of this embodiment may be increased, because of a data interaction delay that is caused by the network interaction, which increases risks of the unmanned driving, and is not favorable to risk control. The placement of the calculation logic in the in-vehicle terminal installed on the target vehicle or the mobile terminal held by the user increases a processing difficulty to a particular extent, but the delivering of the control instruction is not affected by network data interaction, and lane change selection of the vehicle may be manipulated in real time, therefore the response time in the unmanned driving scenario can be ensured to a large extent, and precision of lane change selection can also be ensured.

The foregoing example in FIG. 3 is only an example of a system architecture for implementing the embodiments of the present disclosure. The embodiments of the present disclosure are not limited to the foregoing system structure in FIG. 3, and each embodiment of the method of the present disclosure is proposed based on the foregoing system architecture in FIG. 3.

Figure 4:
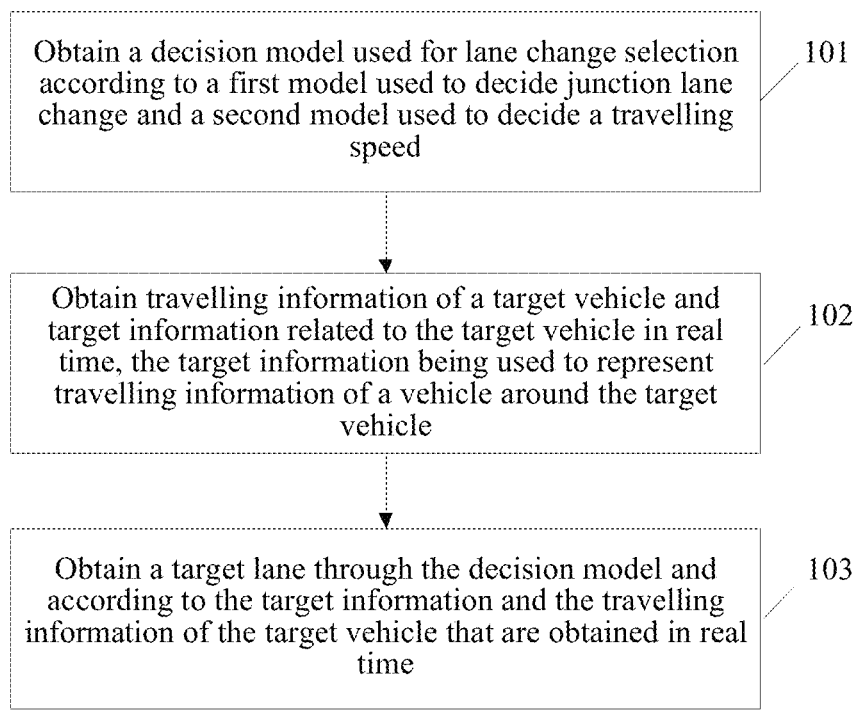
FIG. 4 is a schematic diagram of an implementation process of a method according to an embodiment of the present disclosure.

An embodiment of the present disclosure provides a lane selection method. As shown in FIG. 4 the method includes the following steps: Obtain a decision model used for lane change selection according to a first model used to decide junction lane change and a second model used to decide a travelling speed (101). An example is: 1) the first model is the MLC used to evaluate whether time t required by the current vehicle to travel to a junction is greater than time required by lane change, and the MLC is used to make a decision on junction lane change, for example, because of impact from a junction or the like, departure from a current lane is required currently. 2). The second model is the DLC and a decision of the DLC is divided into two steps namely, lane selection and gap acceptance for determining lane change. In the lane selection, whether lane change is required on a neighboring lane is determined, according to comprehensive information, such as a speed and a lane speed limit and in the gap acceptance; whether a sufficient lane change space exists is judged according to a distance between a front vehicle and a rear vehicle on the neighboring lane. Only when the two conditions are satisfied at the same time, a lane change decision is made. The DLC is used to improve the travelling speed. For example, if the front vehicle is relatively close to the rear vehicle, deceleration is required; if the distance between the front vehicle and the rear vehicle allows overtaking, acceleration is required. Obtain travelling information of a target vehicle and target information related to the target vehicle in real time. The target information is used to represent travelling information of a vehicle around the target vehicle (102). The target information includes but is not limited to: 1) geographic location information of a surrounding vehicle, where it should be noted that the information is absolute location information; 2) distance information of a surrounding vehicle relative to the target vehicle, where it should be noted that different from the geographic location information, the information is relative location information; 3) a surrounding environment when a surrounding vehicle is in neutral (e.g., parking on a roadside to have a rest) and speed information of the surrounding vehicle; 4) a lane on which a surrounding vehicle is currently travelling when there is a plurality of lanes that may be selected; and so on. For example, in a driving process, whether a lane change operation may be performed can be decided according to the speed of the current vehicle, the speed of the front vehicle, the distance, and the speed and the distance on the neighboring lane. An objective is to improve the travelling speed of the current vehicle. Obtain a target lane through the decision model and according to the target information and the travelling information of the target vehicle that are obtained in real time (103). For example, a plurality of utilities (or utility values) of the current lane, the left lane and the right lane are calculated, and finally a lane having a maximum utility of the plurality of utilities is selected as a change lane that is used for lane selection.

Further, a control instruction may be further obtained according to the target information related to the target vehicle, target vehicle information obtained in real time and the decision model, and lane selection in unmanned driving is performed according to the control instruction. In an automatic travelling or manual acceleration scenario of a vehicle, a driver selects a most proper lane to perform travelling. However, in an unmanned driving scenario of this embodiment of the present disclosure, only when a vehicle has the same capability of autonomously selecting an optimal lane as that of a driver, the vehicle can travel on a multi-lane expressway or city road, otherwise the vehicle cannot set out on a journey. This embodiment of the present disclosure is a lane selection solution. The lane selection solution integrates a surrounding vehicle and a navigation path, and modeling is performed according to the DLC and the MLC so as to integrate the DLC and the MLC into a newly created decision model. Utilities of the current lane, the left lane and the right lane are respectively calculated and finally a lane having a maximum utility (utility value) is selected as a change lane that is used for lane change selection, thereby resolving a problem of autonomously selecting a lane by an unmanned driving vehicle. In this embodiment of the present disclosure, advantages of the DLC and the MLC are effectively combined to obtain a more optimized decision model. If the decision model is used, when a distance to a junction is larger, the DLC model plays a main role, and when the distance to the junction is smaller, impact from the MLC model is larger, which ensure stability of a target lane selected within a particular distance range, and back-and-forth switching does not occur.

Another example is: 1). A first type of utilities of lanes that are related to the first model are determined, according to a quantity of lane change times of the target vehicle (for example, nlanechange), a distance from the target vehicle to a junction (for example, distanceToJunction), and a minimum distance of single lane change (for example, d0). In this embodiment, the first type of utilities include values respectively corresponding to a current lane on which the target vehicle is currently located, a left lane and a right lane that are adjacent to the target vehicle. For example, the type of utilities may be calculated by using a formula U_MLC=p2×pow (nlanechange (distanceToJunction/d0), p3), where p2 and p3 are weight values. The pow function is to raise the first parameter to the power of the second parameter, and is a binary arithmetic function acting on a time series. Optionally an exponential model may be used as the first model, such as the MLC, and advantages of such processing are: impact of the MLC is quickly increased as the distance from the target vehicle to the junction is gradually reduced, and finally plays an absolute dominant role near the junction, so that impact of the second model, such as the DLC, may be neglected and intermediate transition is smooth and natural. Such design conforms to an actual lane change law 2). A second type of utilities related to the second model are determined according to speed information of the target vehicle (for example, laneSpeed) and lane speed limit information (for example, SPEED_LIMIT). The speed information of the target vehicle can also be referred to as speed information of candidate lanes, which provides a recommended speed limit to the target vehicle in the candidate lanes. The candidate lanes can be selected by the target vehicle for lane change. The lane speed limit information can also be referred to as speed limit information. Each of the candidate lanes has respective speed limit information. In this embodiment, the second type of utilities are respectively calculated corresponding to the current lane on which the target vehicle is currently located, the left lane and the right lane that are adjacent to the target vehicle. For example, the type of utilities may be calculated by using a formula U_DLC=p1×laneSpeed/SPEED_LIMIT, where p1 is a weight value 3). Lane comprehensiveness utilities (or comprehensive utility values) are obtained according to the first type of utilities and the second type of utilities, where the lane comprehensiveness utilities include lane comprehensiveness utilities respectively corresponding to the current lane on which the target vehicle is currently located, the left lane and the right lane that are adjacent to the target vehicle. The lane comprehensiveness utility is obtained by using a formula Utility=(int)U_DLC−(int)U_MLC. U_DLC and U_MLC are first respectively rounded and then the comprehensiveness utility is calculated. Advantages of such processing is that the method mentioned above is equivalent to grading the key factors such as speed and distance by segments, a biggest advantage is that value stability of utilities may be kept within a particular speed range and distance range, to further ensure stability of a lane change result, and back-and-forth switching does not occur.

Finally, a control instruction is obtained according to the target information related to the target vehicle, target vehicle information obtained in real time and the decision model, and lane selection in unmanned driving is performed according to the control instruction. For example, a plurality of utilities of the current lane, the left lane and the right lane are calculated, and finally a lane having a maximum utility of the plurality of utilities is selected as a change lane, which is used for lane selection. In other words, from the lane comprehensiveness utilities which respectively correspond to the current lane on which the target vehicle is currently located, the left lane and the right lane that are adjacent to the target vehicle, a lane having a maximum lane comprehensiveness utility is selected, and the lane having the maximum lane comprehensiveness utility is decided as a target lane that is used for lane change selection.

In the lane selection method of this embodiment of the present disclosure, before the determination of the first type of utilities according to a quantity of lane change times of the target vehicle and a distance from the target vehicle to a junction a first type of utilities that is related to the first model, a candidate lane may be further obtained according to a road network condition. The candidate lane may alternatively be referred to as a candidate target lane and this candidate is unnecessarily a target lane that is finally selected for lane change, but just a reference that is first established for an initial calculation requirement, and the candidate target lane may be further a final target lane on which a junction needs to be branched finally, and is not limited to a possibility herein.

In this embodiment of the present disclosure, the road network condition consists of a junction (for example, a cross junction, a two-branch junction or a fork junction) and a next (subsequent) road connected to the junction. During actual application, an MLC target lane is determined according to a connection relationship between a junction and a next road. Among lanes whose current locations are to be selected, a lane that may reach a junction and enter a next road is selected as a target lane according to a connectivity. For example, if the current vehicle is currently on a lane 1 and needs to turn to right at a junction, a lane 2 is selected as a target lane. If the vehicle goes straight and passes through a junction, a plurality of to-be-selected lanes may meet a requirement. In this case, a lane of the to-be-selected lanes that is closest to the current lane is selected as a target lane. The quantity of lane change times of the target vehicle is obtained according to a distance between a current lane on which the target vehicle is currently located and the candidate lane in the first direction (e.g., the Y axis). In other words, after a final target lane is determined, a current quantity of lane change times of each lane relative to the final lane may be calculated. Relative to the first direction (e.g., the Y axis), the second direction herein may be the X axis. If the X axis is a forward direction along a center line of a lane, the Y axis is a direction perpendicular to the center line of the lane. In an embodiment, if the first direction and the second direction are indicated in a plane rectangular coordinate system, two coordinate axes exist in the plane rectangular coordinate system, where a transverse axis is the X axis and a right direction is taken as a positive direction, and a longitudinal axis is the Y axis and an upward direction is taken as a positive direction.

A distance from a current vehicle location to the junction is calculated, according to a distance between the location on the current lane on which the target vehicle is currently located and the junction on the X axis, so as to obtain the distance from the target vehicle to the junction (e.g., distanceToJunction). The minimum distance of single lane change (for example, d0) required for completing single lane change is obtained, according to a current speed and a lane change time of the target vehicle.

In the lane selection method of this embodiment of the present disclosure, before the second type of utilities related to the second model are determined, according to the speed information of the target vehicle and the lane speed limit information, the speed information of the target vehicle is calculated and adjusted in real time, according to detected speed information of a vehicle around the target vehicle.

During selection of a target lane of an unmanned driving vehicle, in order to ensure that the response time is as short as possible, the unmanned driving vehicle needs to judge a travelling condition of a surrounding vehicle at a relatively high frequency. For example, the unmanned driving vehicle needs to pay attention to speed information of a vehicle around the target vehicle so as to dynamically adjust the speed of the target vehicle in real time, according to the speed information. For example, the unmanned driving vehicle estimates the speed of the target vehicle, and may respectively estimate travelling speeds of a current lane, a left lane and a right lane, according to a detected speed of a surrounding vehicle, so as to ensure travelling safety of the target vehicle in the unmanned driving scenario and lane change safety after a target lane is subsequently determined. A largest difference between an unmanned driving vehicle scenario and a self-driving vehicle scenario is whether a judgment of a user is added. In the self-driving vehicle scenario, after an automatic navigation path is pre-estimated, a judgment of the user may be added, which is actually an assistance function for autonomous driving of the user. However, unmanned driving depends on a decision model and is full-automatic, It requires that the response time is as short as possible, in order to ensure travelling safety of the target vehicle in the unmanned driving scenario, and lane change safety after a target lane is subsequently determined. In addition, lane change is abandoned when a danger is identified.

In the lane selection method of this embodiment of the present disclosure, a vertical distance from a center point of the target vehicle (e.g., any point on an axis of the target vehicle or a global center point of the vehicle) to a center line of the current lane is obtained, in order to determine whether the vertical distance is less than a threshold. When the vertical distance is less than the threshold, the target vehicle belongs to the current lane, and the lane speed limit information is obtained according to a preset rule on the current lane. For example, a lane to which the vehicle belongs is judged according to a vertical distance d from the center point of the vehicle to the center line of the lane. When d is less than a particular threshold, for example, d<2.0 m, the vehicle belongs to this lane.

It should be noted that a lane speed herein is obtained with reference to a travelling speed of the vehicle on the current lane. In a special example in a scenario in which only one vehicle, namely the target vehicle exists on the current lane, the lane speed is equal to the travelling speed of the target vehicle on the current lane. Correspondingly, the lane speed limit information is related to the lane speed of the target vehicle which is different from a speed limit index indicated by a speed limit sign on a road, for example, an expressway speed limit stipulated in the traffic rules is usually 60 to 120 km/h, and a speed limit index indicated by a sign in a road segment of an expressway is 90 km/h.

The lane speed and the lane speed limit information herein are dynamically adjusted in real time, according to a travelling condition (e.g., speed information) of a vehicle around the target vehicle, and a speed limit index that is not a fixed value. This is described below by using two embodiments.

1. In the lane selection method of this embodiment of the present disclosure, in a process of obtaining the lane speed limit information, according to the preset rule on the current lane, when at least two vehicles including the target vehicle are detected on the current lane, a minimum speed is recorded as a lane speed, and the minimum speed of the at least two vehicles, which is the lane speed, is used as the lane speed limit information. For the lane speed, a travelling speed of the target vehicle may be adjusted according to a travelling speed of a vehicle around the target vehicle on the current lane. For example, on the current lane whose lane speed is 80 km/h, a vehicle (marked as a vehicle B) exists in a travelling direction of the target vehicle and has a current speed of 70 km/h, and the target vehicle itself (marked as a vehicle A) has a current speed of 75 km/h. The vehicle B is located in front of the vehicle A. Therefore, to avoid a traffic safety problem, such as rear-end collision, a minimum value of the vehicle A and the vehicle B is taken as the lane speed limit information, that is, 70 km/h is used as the lane speed limit information.

2. In the lane selection method of this embodiment of the present disclosure, in a process of obtaining the lane speed limit information according to the preset rule on the current lane, no other vehicle is detected on the current lane in the travelling direction of the target vehicle, the lane speed is used as the lane speed limit information. In an example, if no vehicle exists in front of a self-vehicle on a lane, it is recorded that a lane speed is equal to a maximum speed limit of the lane. The lane speed may be taken according to a specification in a traffic rule, for example, a speed limit index indicated by a speed limit sign on a road. For example, on a current lane whose lane speed is 120 km/h, no vehicle exists in a travelling direction of the target vehicle, that is no vehicle exists in front of the target vehicle itself (marked as a vehicle A), so that a possibility that a potential traffic danger exists is quite low. Therefore, the lane speed is taken as the lane speed limit information, that is, 120 km/h is used as the lane speed limit information.

In the lane selection method of this embodiment of the present disclosure, when it is detected on the current lane that another vehicle exists behind the target vehicle, the another vehicle behind the target vehicle is neglected. In each lane statistics process, if an X coordinate (or referred to as a transverse coordinate) of a vehicle B is less than an X coordinate (or referred to as a transverse coordinate) of a current vehicle A, where the vehicle A is the target vehicle, the vehicle B is another vehicle, and an X axis is a forward direction along a lane center line, a vehicle behind the target vehicle is neglected, because in unmanned driving, regardless of the safety of driving and lane changing, more attention needs to be paid to a travelling speed of a vehicle in front of the target vehicle to prevent the target vehicle from having a rear-end collision with the vehicle. However, no excessive attention needs to be paid to a vehicle behind the target vehicle and the vehicle behind the target vehicle is neglected. In addition to improving the calculation precision of the decision model by excluding factors to which no attention needs to be paid, the calculation speed of the decision model may be further improved. A neglecting policy in a decision policy is described in this embodiment so as to neglect another vehicle behind the terminal. The decision policy may further include another policy, for example, a minimum distance needs to be preset to judge a distance to a junction to determine whether to perform lane change or take a deceleration policy.

In the lane selection method of this embodiment of the present disclosure, a quantity of lanes of a travelling road of the target vehicle is greater than or equal to 3, and the terminal is currently located on a left lane, where the left lane is a pronoun only for convenience of description and includes but is not limited to an express/fast lane occupied by a plurality of vehicles for a long time. To prevent a vehicle from occupying a leftmost lane for a long time, modification processing needs to be performed on speed information of the terminal, according to an adjustment coefficient, to obtain modification speed information (or modified speed information). A second type of utilities related to the second model is determined according to the modification speed information and the lane speed limit information. For example, when the lane quantity is greater than or equal to 3, the current vehicle is currently located on the leftmost lane, in order to calculate the laneSpeed, a discount coefficient is given on the basis of statistics, and k×laneSpeed (usually k=0.9) is used as a lane speed to participate in subsequent U_DLC calculation. An advantage of such processing is to ensure that no vehicle occupies the leftmost lane for a long time under the same condition.

In the lane selection method of this embodiment of the present disclosure, in a process of performing lane selection in unmanned driving according to the control instruction 1) when the control instruction is to keep travelling on the current lane, lane change processing to change to the target lane is not performed 2). When the control instruction is lane change to a left lane, the left lane is used as the target lane and lane change processing to change to the target lane is performed 3). When the control instruction is lane change to a right lane, the right lane is used as the target lane and lane change processing change to the target lane is performed. Lane change types are judged through these means. Final lane change types are respectively three conditions, namely, keeping a current lane, lane change to left and lane change to right.

In an example, utilities may be calculated in an order of the current lane, the left lane and the right lane, and a lane having a maximum utility is selected as a target lane for lane change. This order ensures that overtaking is performed preferably from the left lane during overtaking. If the utilities are the same, it is preferable to keep the current lane 1). The utility of the current lane may be calculated, a lane change type is recorded as keeping a current lane, and uMax is updated; and 2) the utility of the left lane is calculated and is recorded as u_left. If u_left>u_uMax, LaneChange=lane change to left is recorded, and uMax is updated to be equal to u_left. 3). The utility of the right lane is calculated and is recorded as u_right. If u_right>u_uMax, LaneChange=lane change to right is recorded.

In each of the foregoing embodiments, using an unmanned driving scenario as an example, for the in-vehicle terminal or the target vehicle carrying the mobile terminal, the target lane may be evaluated and selected. However in each of the foregoing embodiments, no attention has been paid to whether lane change may be performed immediately.

It may be understood that, lane selection in unmanned driving is performed according to the control instruction. After the target lane is obtained, whether another preset rule is met may be further judged with reference to a travelling condition of the target vehicle, surrounding static and dynamic obstacles. If the another preset rule is met, change from the current lane on which current unmanned driving of the target vehicle is located to the target lane is immediately performed; otherwise lane change processing of changing to the target lane is not performed. In other words, after the target lane is selected, whether lane change can be normally performed depends on a subsequent motion plan of a system and the vehicle system judges, at a relatively high frequency, whether surrounding static and dynamic obstacles affect lane change to ensure lane change safety. If a danger exists lane change is abandoned.

Figure 5:
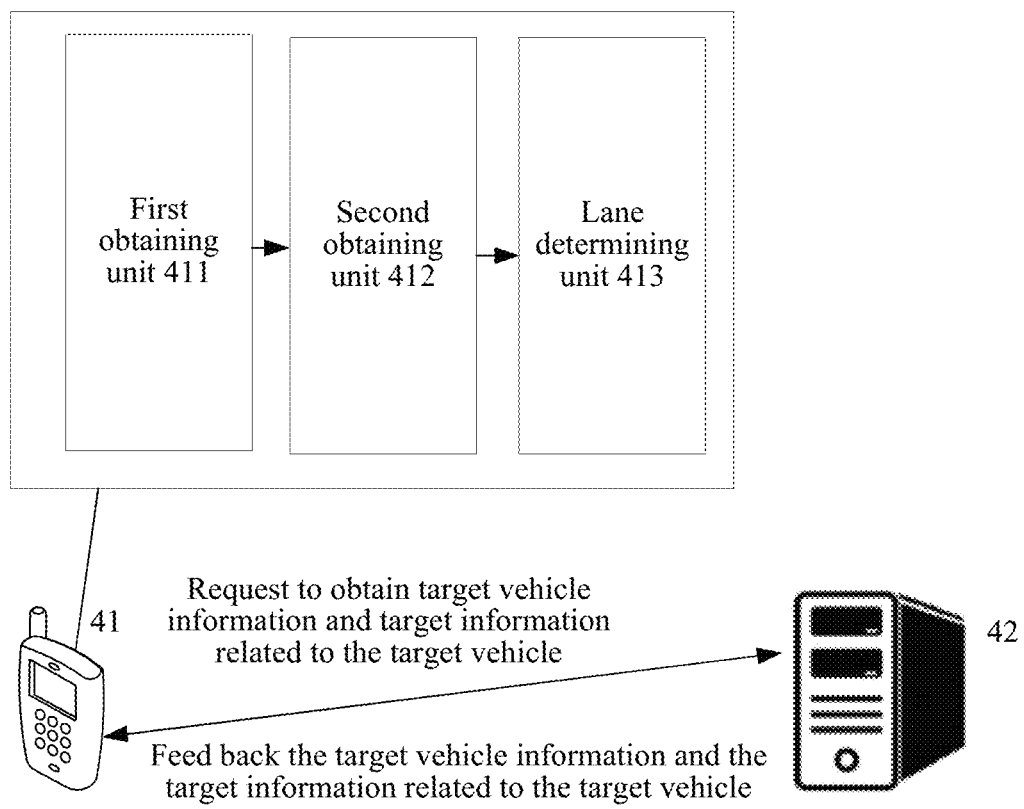
FIG. 5 is a schematic diagram of a system architecture according to an embodiment of the present disclosure.

In a lane selection system of this embodiment of the present disclosure, as shown in FIG. 5, a terminal 41 (an in-vehicle terminal installed on a target vehicle or a mobile terminal held by a user) and a server 42 are included, where the target vehicle performs calculation logic, according to a data source provided by the server so as to perform corresponding lane selection processing. The server is configured to provide various data sources required by the target vehicle, which includes a current vehicle and another vehicle related to the current vehicle, and the data may be stored in the terminal device that is installed on the target vehicle (the in-vehicle terminal or the mobile terminal held by the user). Further, lane selection may be performed through a control instruction delivered by the target vehicle. The terminal 41 includes: a first obtaining unit 411, configured to obtain a decision model used for lane change selection according to a first model that is used to decide junction lane change, and a second model that is used to decide a travelling speed; a second obtaining unit 412, configured to obtain travelling information of a target vehicle and target information related to the target vehicle in real time. The target information is used to represent travelling information of a vehicle around the target vehicle; and a lane determining unit 413, configured to obtain a target lane through the decision model and according to the target information and the travelling information of the target vehicle that are obtained in real time. The target information related to the target vehicle is used to represent travelling information of a vehicle around the target vehicle.

By using this embodiment of the present disclosure, target information related to the target vehicle is first obtained, and the target information is used to represent travelling information of a vehicle around the target vehicle. The target information includes: 1) geographic location information of a surrounding vehicle, where it should be noted that the information is absolute location information; 2) distance information of a surrounding vehicle relative to the current target vehicle, where it should be noted that different from the geographic location information, the information is relative location information; 3) a surrounding environment when a surrounding vehicle is in neutral (e.g., parking on a roadside to have a rest) and speed information of the surrounding vehicle; 4) a lane on which a surrounding vehicle is currently travelling when there is a plurality of lanes that may be selected; and so on. For example, in a driving process, whether a lane change operation may be performed can be decided according to the speed of the current vehicle, the speed of the front vehicle, the distance, and the speed and the distance on the neighboring lane. The objective is to improve the travelling speed of the current vehicle. Then, modeling is performed according to a first model used to decide junction lane change, and a second model used to decide a travelling speed to obtain a decision model used for lane change selection. An example is 1) the first model is the MLC used to evaluate whether time t required by the current vehicle to travel to a junction is greater than time required by lane change, and the MLC is used to make a decision on junction lane change, for example, because of impact from a junction or the like, departure from a current lane is required currently. 2). The second model is the DLC, and a decision of the DLC is divided into two steps namely, lane selection and gap acceptance. In the lane selection, whether lane change is required on a neighboring lane is judged according to comprehensive information such as a speed and a lane speed limit; and in the gap acceptance, whether a sufficient lane change space exists is judged according to a distance between a front vehicle and a rear vehicle on the neighboring lane. Only when the two conditions are satisfied at the same time, a lane change decision is made. The DLC is used to improve the travelling speed. For example, if the front vehicle is relatively close to the rear vehicle, deceleration is required; if the distance between the front vehicle and the rear vehicle allows overtaking, acceleration is required.

The lane determining unit is further configured to calculate utilities corresponding to target-vehicle related particular lanes (or candidate lanes) through the decision model, and according to the target information and the travelling information of the target vehicle that are obtained in real time; and use a lane having a maximum utility as the target lane. The particular lanes (candidate lanes) include at least a current lane on which the target vehicle is currently located, a left lane and a right lane that are adjacent to the target vehicle. For example, a plurality of utilities of the current lane, the left lane and the right lane are calculated, and finally a lane having a maximum utility of the plurality of utilities is selected as a change lane that is used for lane selection.

In an automatic travelling or manual acceleration scenario of a vehicle, a driver selects a most proper lane to perform travelling. However, in an unmanned driving scenario of this embodiment of the present disclosure, only when a vehicle has the same capability of autonomously selecting an optimal lane as that of a driver, the vehicle can travel on a multi-lane expressway or city road, otherwise, the vehicle cannot set out on a journey. This embodiment of the present disclosure is a lane selection solution, which integrates a surrounding vehicle and a navigation path, and modeling is performed according to the DLC and the MLC so as to integrate the DLC and the MLC into a newly created decision model. Utilities of the current lane, the left lane and the right lane are respectively calculated, and finally a lane having a maximum utility is selected as a change lane, which is used for lane change selection. Accordingly, a problem of autonomously selecting a lane is resolved by an unmanned driving vehicle. In this embodiment of the present disclosure, advantages of the DLC and the MLC are effectively combined to obtain a more optimized decision model, and the decision model is used. When a distance to a junction is larger, the DLC model plays a main role, and when the distance to the junction is smaller, impact from the MLC model is larger to ensure stability of a target lane selected within a particular distance range, and back-and-forth switching does not occur.

In an implementation of this embodiment of the present disclosure, the lane determining unit is further configured to determine a first type of utilities related to the first model, according to a quantity of lane change times of the target vehicle, a distance from the target vehicle to a junction, and a minimum distance of single lane change, where the first type of utilities include a first type of utilities respectively corresponding to a current lane on which the target vehicle is currently located, a left lane and a right lane that are adjacent to the target vehicle; determine a second type of utilities of the particular (candidate) lanes that are related to the second model, according to speed information of the target vehicle and lane speed limit information, where the second type of utilities include a second type of utilities respectively corresponding to the current lane on which the target vehicle is currently located, the left lane and the right lane that are adjacent to the target vehicle; and obtain lane comprehensiveness utilities of the particular (candidate) lanes according to the first type of utilities and the second type of utilities, where the lane comprehensiveness utilities include lane comprehensiveness utilities respectively corresponding to the current lane on which the target vehicle is currently located, the left lane and the right lane that are adjacent to the target vehicle. From the lane comprehensiveness utilities respectively corresponding to the current lane on which the target vehicle is currently located, the left lane and the right lane that are adjacent to the target vehicle, a lane having a maximum lane comprehensiveness utility is selected and the lane having the maximum lane comprehensiveness utility is decided as a target lane that is used for lane change selection.

In an implementation of this embodiment of the present disclosure, the lane determining unit is further configured to obtain a candidate lane according to a road network condition, where the road network condition consists of the junction and a next road connected to the junction. The target vehicle further includes: a unit for determining a quantity of lane change times configured to obtain the quantity of lane change times of the target vehicle according to a distance between a current lane on which the target vehicle is currently located and the candidate lane in a first direction; a distance determining unit, configured to obtain the distance from the target vehicle to the junction according to a distance between a location on a current lane on which the target vehicle is currently located and the junction in a second direction; and a unit for determining a distance of single lane change, configured to obtain, according to a current speed and a lane change time of the target vehicle, the minimum distance of single lane change required for completing single lane change.

In an implementation of this embodiment of the present disclosure, the target vehicle further includes: a speed detection unit, configured to calculate and adjust, in real time, the speed information of the target vehicle according to speed information of the detected vehicle around the target vehicle; and a speed limit determining unit, configured to obtain a vertical distance from a center point of the target vehicle to a center line of the current lane; judge whether the vertical distance is less than a threshold; determine, when the vertical distance is less than the threshold, that the target vehicle belongs to the current lane; and obtain the lane speed limit information according to a preset rule on the current lane.

In an implementation of this embodiment of the present disclosure, the speed limit determining unit is further configured to use, when at least two vehicles including the target vehicle are detected on the current lane, a minimum speed of the at least two vehicles as the lane speed limit information.

In an implementation of this embodiment of the present disclosure, the speed limit determining unit is further configured to use, when it is detected on the current lane that no other vehicle exists in a travelling direction of the target vehicle, a lane speed as the lane speed limit information.

In an implementation of this embodiment of the present disclosure, the target vehicle further includes a neglect decision unit, configured to neglect, when it is detected on the current lane that another vehicle exists behind the target vehicle, the another vehicle behind the target vehicle.

In an implementation of this embodiment of the present disclosure, the target vehicle further includes a modification decision unit, configured to perform, when a quantity of lanes of a travelling road of the target vehicle is greater than or equal to 3 and the target vehicle is currently located on a left lane, modification processing on the speed information of the target vehicle according to an adjustment coefficient to obtain modification speed information; and the lane determining unit is further configured to determine again, according to the modification speed information and the lane speed limit information a second type of utilities related to the second model.

In an implementation of this embodiment of the present disclosure, the lane determining unit is further configured to skip, when the control instruction is to keep travelling on the current lane, performing lane change processing to change to the target lane; use, when the control instruction is lane change to a left lane, the left lane as the target lane and perform lane change processing to change to the target lane; and use, when the control instruction is lane change to a right lane, the right lane as the target lane and perform lane change processing to change to the target lane.

In an implementation of this embodiment of the present disclosure, the target vehicle further includes a lane change decision unit, configured to perform lane selection according to the control instruction and immediately change after the target lane is obtained from the current lane on which the target vehicle is currently located to the target lane when a preset rule is met, otherwise skip performing lane change processing of changing to the target lane.

For a processor used for data processing, when processing is performed, the processing may be implemented by using a microprocessor, a central processing unit (CPU), a DSP or an FPGA; and for a storage medium, operation instructions are included, the operation instructions may be computer executable code, and steps in the process of the information processing method of the foregoing embodiment of the present disclosure are implemented through the operation instructions.

It should be noted herein that the above descriptions related to the terminal and the server are similar to the description of the foregoing method, and the terminal and the server have the same beneficial effects as those of the method. Details are not described. For understanding of technical details that are not disclosed in the terminal and server embodiments of the present disclosure, refer to the described content of the embodiment described in the process of the method of the present disclosure.

Using an actual application scenario as an example, an embodiment of the present disclosure is described as follows:

Driving motion modeling mainly includes two aspects, namely, a longitudinal aspect and a transverse aspect. Longitudinal driving motions mainly include braking, following and the like. A main transverse driving motion is a lane change model. A lane change motion is a comprehensive motion process in which a driver adjusts and completes a driving target policy of the driver, which includes information judgment and operation execution, according to a driving characteristic of the driver, and in response to a stimulus of surrounding environment information such as a speed of a surrounding vehicle or a neutral position. It is considered that such a motion is very complex and even difficult to be described by using a mathematical model. Lane change models may be divided into a DLC model and an MLC model. The DLC is used to improve a travelling speed and the MLC is associated with, because of impact from a junction or the like, departure from a current lane that is required. At first, whether the MLC needs to be considered is judged. For example, whether time t required by the current vehicle to travel to a junction is greater than time required by lane change is evaluated. Assuming that a travelling road needs to be changed to a rightmost lane, and needs to be changed by n lanes relative to the current lane, and time t0 is required to be changed for each lane; if t>n×t0, only the DLC needs to be considered, otherwise both the MLC and the DLC need to be considered. When the MLC conflicts with the DLC, a result of the MLC is used as the criterion. In a decision of the DLC for the lane selection, whether lane change is required on a neighboring lane is judged according to comprehensive information such as a speed and a lane speed limit. For the gap acceptance, whether a sufficient lane change space exists is judged according to a distance between a front vehicle and a rear vehicle on the neighboring lane. Only when the two conditions are satisfied at the same time, a lane change decision is made. In a travelling process, a driver usually decides, according to the speed of the current vehicle, the speed of the front vehicle, the distance, and the speed and the distance on the neighboring lane, whether a lane change operation may be performed. The objective is to improve the travelling speed of the current vehicle.

In foregoing embodiment, lane change selection performed by merely using the MLC model or the DLC model cannot achieve objectives of timely response and precise lane change selection. In the following embodiment, the DLC and the MLC are integrated in one model, utilities of the current lane, the left lane and the right lane are respectively calculated and finally a lane having a maximum utility is selected as a change lane.

Figure 6:
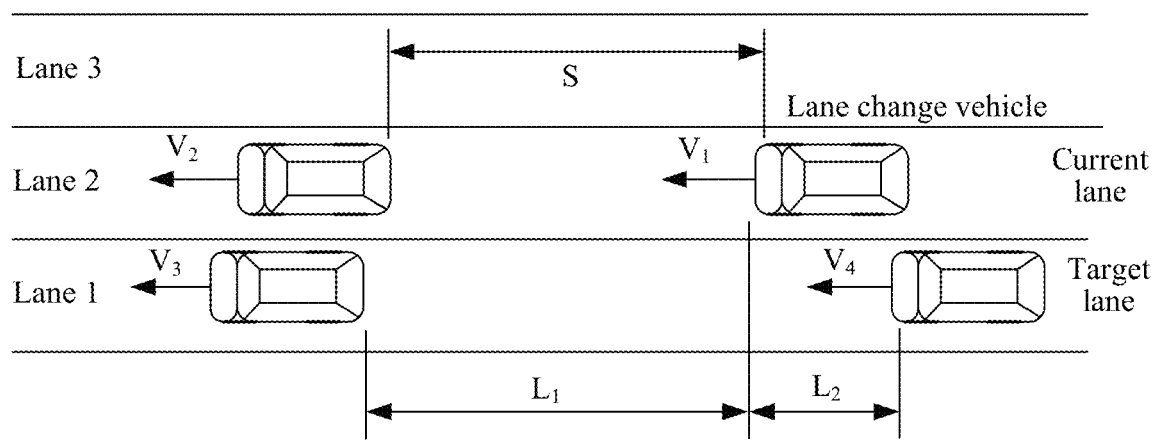
FIG. 6 is a schematic diagram of key parameters of a lane change motion decision to which an embodiment of the present disclosure is applied.
Figure 7:
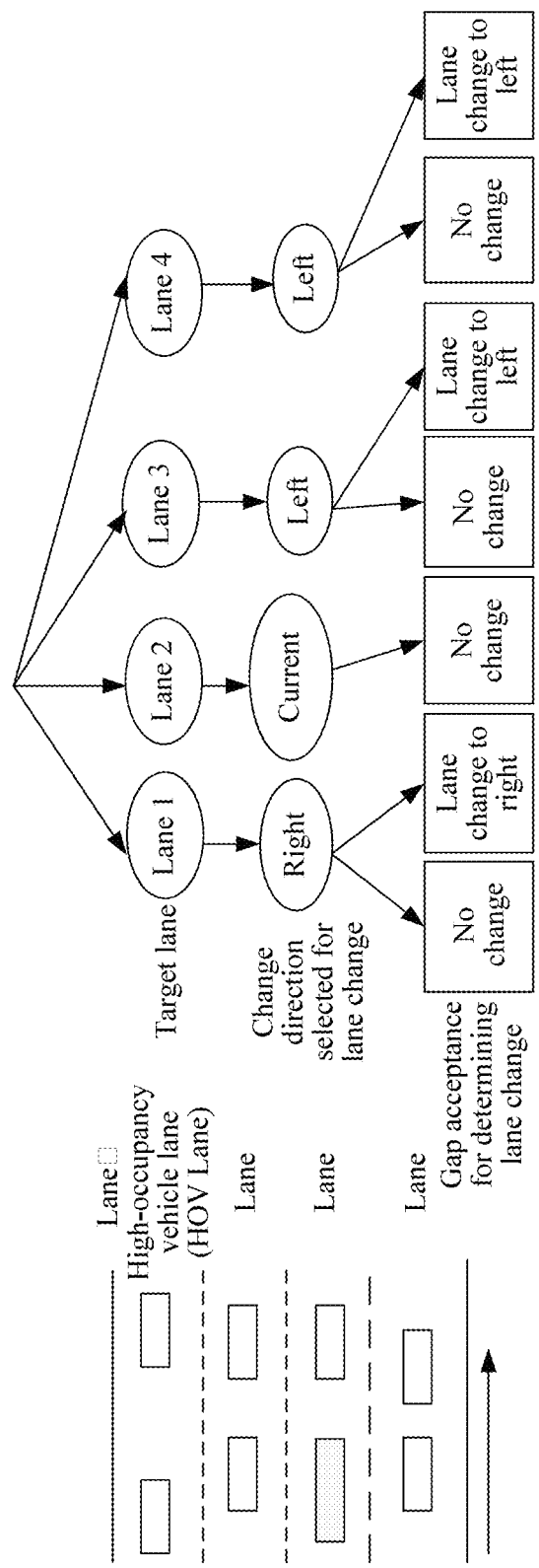
FIG. 7 is a schematic structural diagram of a decision model used for lane change selection to which an embodiment of the present disclosure is applied.
Figure 8:
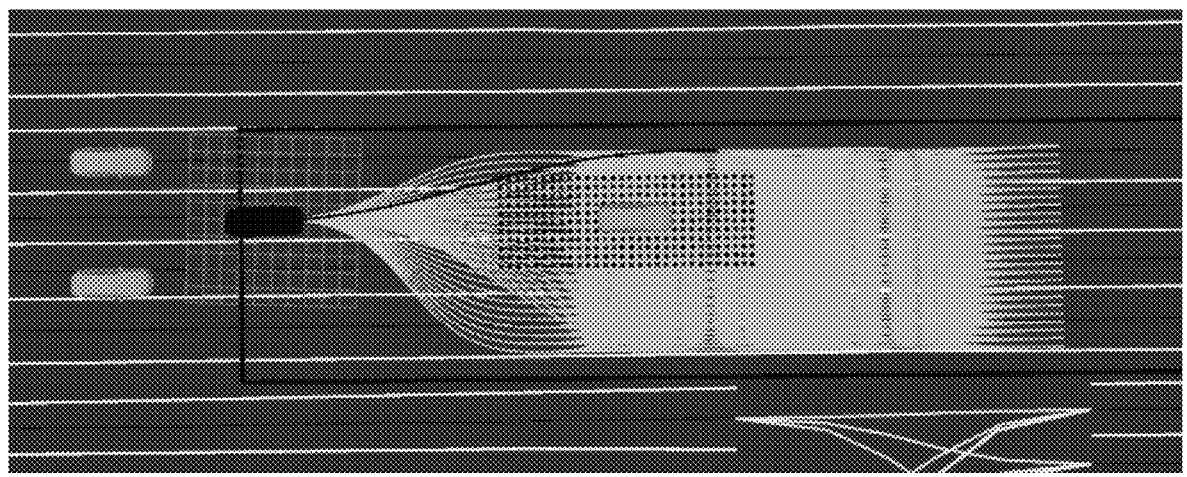
FIG. 8 is a schematic diagram of a sampled lane change selection condition in an actual application to which an embodiment of the present disclosure is applied.

Using an unmanned driving scenario as an example an embodiment of the present disclosure is described as follows:

FIG. 6 to FIG. 8 are schematic diagrams illustrating key parameters used in an embodiment of the present disclosure in an unmanned driving scenario, a structure of a decision model, and a sampled lane change selection condition in actual application. FIG. 6 is a schematic diagram of key parameters of a lane change motion decision, where S is a distance to a front vehicle on a current lane; $L_1$ is a front clear distance on a target lane; $L_2$ is a rear clear distance on the target lane; $V_1$ is a speed of a lane change vehicle; $V_2$ is a speed of the front vehicle on the current lane; $V_3$ is a speed of a front vehicle on a neighboring lane; and $V_4$ is a speed of a rear vehicle on the neighboring lane. FIG. 7 is a schematic structural diagram of a decision model used for lane change selection, and FIG. 8 is a schematic diagram of a sampled lane change selection condition in actual application.

Figure 9:
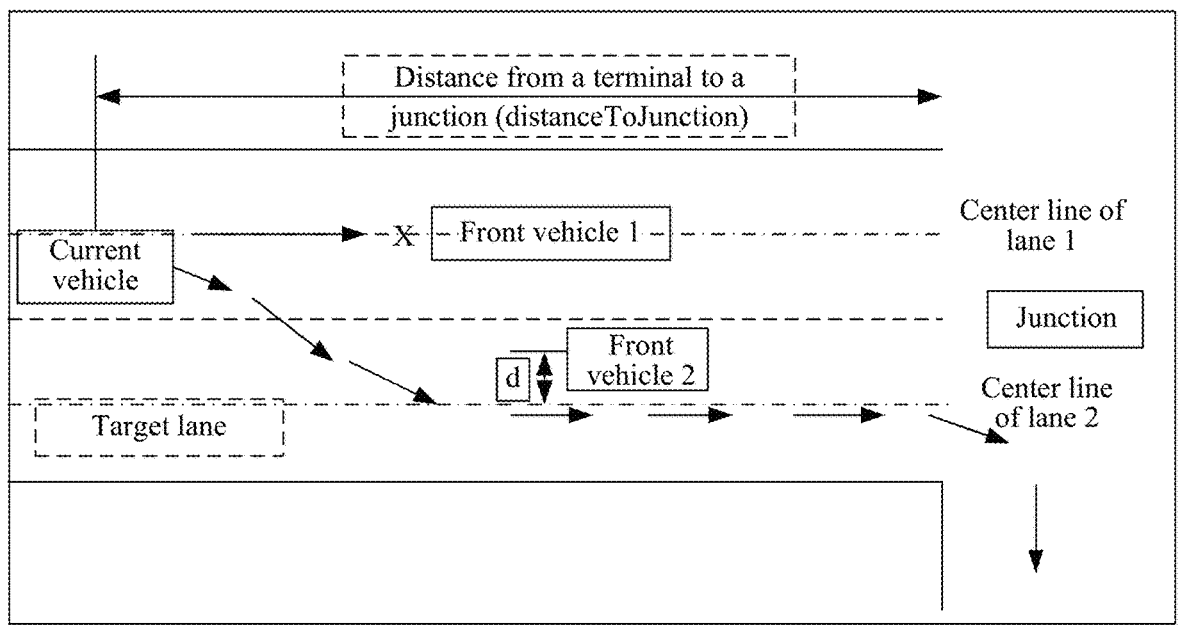
FIG. 9 is a schematic diagram of a lane change selection process to which an embodiment of the present disclosure is applied.

Based on the foregoing content shown in FIG. 6 to FIG. 8, in this embodiment, attention is mainly paid to target lane selection of an unmanned driving vehicle which is different from a conventional lane change model. At the current stage, the unmanned driving vehicle only pays attention to evaluation and selection of a target lane, and does not pay attention to whether lane change may be immediately performed. After the target lane is selected, whether lane change can be normally performed depends on a subsequent motion plan, and the vehicle judges at a relatively high frequency whether surrounding static and dynamic obstacles affect lane change to ensure lane change safety. If a danger exists, lane change is abandoned. Using a lane change selection process shown in FIG. 9 as an example, description is made as follows:

The lane change selection process in FIG. 9 includes the following content.

First step. Determine a final target lane according to a junction, that is, find an MLC-based target lane.

Specifically, an MLC target lane is determined according to a connection relationship between a junction and a next road. Among lanes whose current locations are to be selected, a lane that may reach a junction and enter a next road is selected as a target lane according to a connectivity. For example, if the current vehicle is currently on a lane 1 and needs to turn to right at a junction, a lane 2 is selected as a target lane. If the vehicle goes straight and passes through a junction, a plurality of to-be-selected lanes may meet a requirement. In this case, a lane of the to-be-selected lanes that is closest to the current lane is selected as a target lane.

After the final target lane is determined, a current quantity of lane change times of each lane to the final lane (e.g., nlanechange) may be calculated. Assuming that a forward direction along a lane center line is an X axis, a distance from a current vehicle location to a junction is calculated and the distance is recorded as distanceToJunction.

Second step. Estimate a lane speed that is, calculate a DLC-based lane speed.

Travelling speeds (e.g., laneSpeed) of a current lane, a left lane and a right lane are respectively estimated according to a detected speed of a surrounding vehicle.

A lane to which the vehicle belongs is first judged according to a vertical distance d from the center point of the vehicle to the center line of the lane. When d is less than a particular threshold, for example, d<2.0 m, the vehicle belongs to this lane.

In each lane statistics process, a vehicle behind the current vehicle is neglected (if an x coordinate is less than an x coordinate of the current vehicle the vehicle is neglected). If a plurality of vehicles exists, a minimum speed is recorded as a lane speed, and if no vehicle exists in front of a self-vehicle on a lane it is recorded that a lane speed is equal to a maximum speed limit (for example, SPEED_LIMIT) of the lane.

When the lane quantity is greater than or equal to 3, the current vehicle is currently located on the leftmost lane and laneSpeed is calculated, a discount coefficient is given on the basis of statistics. For example k×laneSpeed (usually k=0.9) is used as a lane speed to participate in subsequent U_DLC calculation. In this way, it is ensured that no vehicle occupies the leftmost lane for a long time under the same condition.

Third step. Calculate utilities of lanes, that is, integrate comprehensive utilities obtained based on utilities of the MLC and the DLC.

A DLC related utility is calculated according to a lane speed (laneSpeed) and a maximum speed limit (SPEED_LIMIT) for a particular (specific) lane by using a formula (1).

$$U\_DLC = p1 \times \text{laneSpeed}/\text{SPEED\_LIMIT} \qquad (1)$$

An MLC related utility is calculated according to a quantity of lane change times (nlanechange), a distance from a vehicle to a junction (distanceToJunction), and a minimum distance d0 required for single lane change by using a formula (2).

$$U\_MLC = p2 \times pow(\text{lanechange}(\text{distanceToJunction}/d0), p3) \qquad (2)$$

d0 is a minimum distance that is required for completing single lane change and that is estimated according to a current speed and a lane change time, and a calculation method is shown in a formula (3).

$$d0 = \text{MAX}(d\text{min}, \text{vehicleSpeed} \times t0) \qquad (3)$$

dmin and t0 are constants and may be endowed with values according to an actual need, and vehicleSpeed is a speed of the current vehicle, and t0 is time that is required for completing single lane change and is estimated according to experience. It is suggested that dmin=50 m, and t0=10 s.

p1, p2, and p3 are respectively weight coefficients and may be adjusted according to a need usually, p1=10, p2=2.0, and p3=2.0.

A method for calculating a lane comprehensiveness utility is shown in a formula (4).

$$\text{Utility} = (\text{int})U\_DLC - (\text{int})U\_MLC \qquad (4)$$

It is noted that, U_DLC and U_MLC are first respectively rounded and then the comprehensiveness utility is calculated. In this way, it is equivalent to grading key factors such as speed and distance. A biggest advantage is that value stability of utilities may be kept within a particular speed range and distance range so as to further ensure stability of a lane change result, and back-and-forth switching does not occur.

An exponential model is used for the MLC so that impact of the MLC is quickly increased as distanceToJunction is gradually reduced, and finally plays an absolute dominant role near the junction therefore, impact of the DLC may be neglected and intermediate transition is smooth and natural. Such design conforms to an actual lane change law.

Fourth step. Judge a lane change type.

Final lane change types. LaneChange are respectively three conditions, namely, keeping a current lane, lane change to left and lane change to right.

Utilities may be calculated in an order of the current lane, the left lane and the right lane, and a lane having a maximum utility is selected as a target lane for lane change. This order ensures that overtaking is performed preferably from the left lane during overtaking. If the utilities are the same it is preferable to keep the current lane.

First step. The utility of the current lane is calculated, a lane change type is recorded as keeping a current lane and uMax is updated.

Second step. The utility of the left lane is calculated and is recorded as u_left. If u_left>u_uMax, LaneChange=lane change to left is recorded and uMax is updated to be equal to u_left.

Third step. The utility of the right lane is calculated and is recorded as u_right. If u_right>u_uMax, LaneChange=lane change to right is recorded.

By using this embodiment of the present disclosure, the DLC and the MLC are effectively combined, and transition is natural and the lane change motion is more stable. Impact of the DLC and impact of the MLC on lane selection are effectively combined. A closer distance to a junction indicates a larger role that the MLC plays. In addition, transition is smooth and natural and an objective law is met. Graded processing is performed on key factors such as a speed and a distance to a junction, to ensure stability of a lane change result and no jitter phenomenon occurs. A principle of preferably overtaking from the left side is ensured but a leftmost lane is not occupied for a long time. The particular judgment order and rule used in the used decision model ensure overtaking from the left side under a similar condition; and for a road having a relatively large quantity of lanes, a vehicle may occupy an overtaking lane on a leftmost side for a long time. Such a way better meets the traffic rule and meets the objective condition of roads in China.

Figure 10:
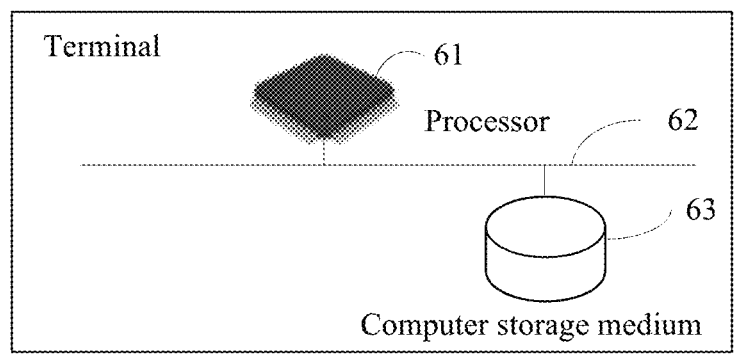
FIG. 10 is a diagram of a hardware structure of an in-vehicle terminal installed on a target vehicle or a mobile terminal held by a user according to an embodiment of the present disclosure.

An embodiment of the present disclosure provides a terminal (an in-vehicle terminal installed on a target vehicle or a mobile terminal held by a user). As shown in FIG. 10, the terminal includes a processor 61, and a memory configured to store a computer program capable of being run on the processor. A representation form of the memory may be a computer storage medium 63 shown in FIG. 10. The terminal further includes a bus 62 used for data communication.

When being configured to run the computer program the processor performs:

obtaining a decision model used for lane change selection according to a first model used to decide junction lane change and a second model used to decide a travelling speed.

obtaining travelling information of a target vehicle and target information related to the target vehicle in real time, the target information being used to represent travelling information of a vehicle around the target vehicle; and obtaining a target lane through the decision model and according to the target information and the travelling information of the target vehicle that are obtained in real time.

When being configured to run the computer program the processor further performs:

calculating utilities corresponding to target-vehicle related particular lanes through the decision model and according to the target information and the travelling information of the target vehicle that are obtained in real time; and using a lane having a maximum utility as the target lane.

The particular lanes include at least a current lane on which the target vehicle is currently located and a left lane and a right lane that are adjacent to the target vehicle.

When being configured to run the computer program the processor further performs:

determining, according to a quantity of lane change times of the target vehicle a distance to a junction, and a minimum distance of single lane change a first type of utilities being of the particular lanes and being related to the first model.

determining, according to speed information of the target vehicle and lane speed limit information a second type of utilities being of the particular lanes and being related to the second model; and obtaining lane comprehensiveness utilities of the particular lanes according to the first type of utilities and the second type of utilities.

When being configured to run the computer program the processor further performs:

obtaining a candidate lane according to a road network condition, where the road network condition consists of the junction and a next road connected to the junction;

obtaining the quantity of lane change times of the target vehicle according to a distance between a current lane on which the target vehicle is currently located and the candidate lane in a first direction;

obtaining the distance from the target vehicle to the junction according to a distance between a location on a current lane on which the target vehicle is currently located and the junction in a second direction; and obtaining, according to a current speed and a lane change time of the target vehicle, the minimum distance required for completing single lane change.

When being configured to run the computer program the processor further performs:

calculating and adjusting, in real time, the speed information of the target vehicle according to speed information of the detected vehicle around the target vehicle; and obtaining a vertical distance from a center point of the target vehicle to a center line of the current lane judging whether the vertical distance is less than a threshold determining, when the vertical distance is less than the threshold, that the target vehicle belongs to the current lane and obtaining the lane speed limit information according to a preset rule on the current lane.

When being configured to run the computer program the processor further performs:

using, when at least two vehicles including the target vehicle are detected on the current lane, a minimum speed of the at least two vehicles as the lane speed limit information.

When being configured to run the computer program the processor further performs:

using, when it is detected on the current lane that no other vehicle exists in a travelling direction of the target vehicle, a lane speed as the lane speed limit information.

When being configured to run the computer program the processor further performs:

neglecting, when it is detected on the current lane that another vehicle exists behind the target vehicle, the another vehicle behind the target vehicle.

When being configured to run the computer program the processor further performs:

performing, when a quantity of lanes of a travelling road of the target vehicle is greater than or equal to 3 and the target vehicle is located on a left lane, modification processing on the speed information of the target vehicle according to an adjustment coefficient to obtain modification speed information; and determining again, according to the modification speed information and the lane speed limit information a second type of utilities being of the particular lanes and being related to the second model.

An embodiment of the present disclosure provides a computer storage medium, computer executable instructions being stored in the computer storage medium, and the computer executable instructions being used to perform:

obtaining a decision model used for lane change selection according to a first model used to decide junction lane change and a second model used to decide a travelling speed;

obtaining travelling information of a target vehicle and target information related to the target vehicle in real time, the target information being used to represent travelling information of a vehicle around the target vehicle; and obtaining a target lane through the decision model and according to the target information and the travelling information of the target vehicle that are obtained in real time.

The computer executable instructions are used to further perform:

calculating utilities corresponding to target-vehicle related particular lanes through the decision model and according to the target information and the travelling information of the target vehicle that are obtained in real time; and using a lane having a maximum utility as the target lane.

The particular lanes include at least a current lane on which the target vehicle is currently located and a left lane and a right lane that are adjacent to the target vehicle.

The computer executable instructions are used to further perform:

determining, according to a quantity of lane change times of the target vehicle a distance to a junction, and a minimum distance of single lane change a first type of utilities being of the particular lanes and being related to the first model;

determining, according to speed information of the target vehicle and lane speed limit information a second type of utilities being of the particular lanes and being related to the second model; and obtaining lane comprehensiveness utilities of the particular lanes according to the first type of utilities and the second type of utilities.

The computer executable instructions are used to further perform:

obtaining a candidate lane according to a road network condition, where the road network condition consists of the junction and a next road connected to the junction;

obtaining the quantity of lane change times of the target vehicle according to a distance between a current lane on which the target vehicle is currently located and the candidate lane in a first direction;

obtaining the distance from the target vehicle to the junction according to a distance between a location on a current lane on which the target vehicle is currently located and the junction in a second direction; and obtaining, according to a current speed and a lane change time of the target vehicle, the minimum distance required for completing single lane change.

The computer executable instructions are used to further perform:

calculating and adjusting, in real time, the speed information of the target vehicle according to speed information of the detected vehicle around the target vehicle; and obtaining a vertical distance from a center point of the target vehicle to a center line of the current lane judging whether the vertical distance is less than a threshold determining, when the vertical distance is less than the threshold, that the target vehicle belongs to the current lane and obtaining the lane speed limit information according to a preset rule on the current lane.

The computer executable instructions are used to further perform:

using, when at least two vehicles including the target vehicle are detected on the current lane, a minimum speed of the at least two vehicles as the lane speed limit information.

The computer executable instructions are used to further perform:

using, when it is detected on the current lane that no other vehicle exists in a travelling direction of the target vehicle, a lane speed as the lane speed limit information.

The computer executable instructions are used to further perform:

neglecting, when it is detected on the current lane that another vehicle exists behind the target vehicle, the another vehicle behind the target vehicle.

The computer executable instructions are used to further perform:

performing, when a quantity of lanes of a travelling road of the target vehicle is greater than or equal to 3 and the target vehicle is located on a left lane, modification processing on the speed information of the target vehicle according to an adjustment coefficient to obtain modification speed information; and determining again, according to the modification speed information and the lane speed limit information a second type of utilities being of the particular lanes and being related to the second model.

In the several embodiments provided in this application, it should be understood that the disclosed device and method may be implemented in other manners. The described device embodiments are merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections between components may be implemented through some interfaces. The indirect couplings or communication connections between the devices or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be all integrated into one processing unit, or each of the units may be separately independently used as one unit, or two or more units may be integrated into one unit. The integrated unit may be implemented in the form of hardware, or may be implemented in the form of hardware plus a software functional unit.

Persons of ordinary skill in the art should understand that all or a part of the steps of the method according to the embodiments of the present disclosure may be implemented by a program instructing relevant hardware. The program may be stored in a computer readable storage medium. When the program is run, the steps of the method according to the embodiments of the present disclosure are performed. The storage medium may be any medium that is capable of storing program code, such as a removable storage device a. ROM, a. RAM, a magnetic disk, and an optical disc.

Alternatively, when the integrated unit of the present disclosure is implemented in a form of a software functional unit and sold or used as an independent product, the integrated unit may be stored in a computer-readable storage medium. Based on such an understanding, the technical solutions of the embodiments of the present disclosure essentially, or the part contributing to the prior art may be implemented in a form of a software product. The computer software product is stored in a storage medium and includes several instructions for instructing a computer device (which may be a personal computer, a server, a network device, or the like) to perform all or some of the methods described in the embodiments of the present disclosure. The foregoing storage medium includes: any media that can store program code, such as a removable storage device, a. ROM, a. RAM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the appended claims.

INDUSTRIAL APPLICABILITY

Through the embodiments of the present disclosure, modeling is performed according to models used to represent different decision choices so as to obtain a decision model used for lane change selection. For example, decision results obtained by performing modeling through the DLC and the MLC enable all impact conditions, such as a speed and a junction to be comprehensively considered in an unmanned driving scenario, which better meets an actual requirement. A target lane is obtained through the decision model and according to target information related to the target vehicle and travelling information of a target vehicle that are obtained in real time, and lane selection is performed according to the obtained target lane to implement precise lane change selection so that it can be ensured that a response time is as short as possible.

What is claimed is:

1. A method for lane selection, comprising:
    obtaining, by processing circuitry of an apparatus for the lane selection, a decision model used for a lane change selection based on a first model configured to decide a junction lane change and associated with a mandatory lane change (MLC) and a second model configured to decide a travelling speed and associated with a discretionary lane change (DLC);
    acquiring, by interface circuitry of the apparatus, travelling information of a target vehicle and target information related to the target vehicle in real time, the target information being configured to represent travelling information of one or more vehicles around the target vehicle; and
    defining, by the processing circuitry, a target lane from candidate lanes based on utility values of the candidate lanes that are calculated based on (i) the decision model, (ii) the target information related to the target vehicle and (iii) the travelling information of the target vehicle that is acquired in real time, wherein the utility values of the candidate lanes include MLC utility values of the candidate lanes and DLC utility values of the candidate lanes.

2. The method according to claim 1, wherein the defining comprises:
    defining a lane having a maximum utility value from the calculated utility values as the target lane.

3. The method according to claim 2, wherein the candidate lanes comprise at least one of a current lane on which the target vehicle is currently travelling, a left lane with respect to the current lane, and a right lane with respect to the current lane, the left and right lanes being adjacent to the target vehicle.

4. The method according to claim 3, further comprising calculating the utility values of the candidate lanes by:
    determining a respective first utility value for each of the candidate lanes according to (i) a value of lane change times of the target vehicle, (ii) a distance from the target vehicle to a junction, and (iii) a minimum distance for each of lane changes of the target vehicle, the respective first utility value for each of the candidate lanes being related to the first model;
    determining a respective second utility value for each of the candidate lanes, the respective second utility value for each of the candidate lanes being related to the second model, according to (i) speed information of the candidate lanes and (ii) speed limit information of the candidate lanes, the speed information of the candidate lanes providing a recommended speed limit to the target vehicle in the candidate lanes; and obtaining a respective comprehensive utility value for each of the candidate lanes according to the respective first utility value and the respective second utility value for each of the candidate lanes.

5. The method according to claim 4, further comprising: before the determining the respective first utility value for each of the candidate lanes, determining a first candidate lane from the candidate lanes according to a road network condition, the road network condition including the junction and a subsequent road connected to the junction;

obtaining a first value of lane change times of the target vehicle according to a first distance between the current lane on which the target vehicle is currently travelling and the first candidate lane in a first direction, the first direction being perpendicular to the current lane and the first candidate lane;

obtaining the distance from the target vehicle to the junction according to a second distance between a location of the current lane on which the target vehicle is currently located and the junction in a second direction, the second direction being parallel to the current lane; and obtaining, according to a current speed and an estimated lane change time of the target vehicle, the minimum distance for each of the lane changes.

6. The method according to claim 4, further comprising: before the determining the respective second utility value for each of the candidate lanes, calculating and adjusting a speed of the target vehicle in real time according to speed information of the one or more vehicles around the target vehicle; and obtaining the speed information of the current lane according to a preset rule when a vertical distance from a center point of the target vehicle to a center line of the current lane is less than a threshold value.

7. The method according to claim 6, wherein the obtaining comprises:

applying a minimum speed of two or more vehicles in the current lane as the speed information of the current lane when the two or more vehicles are detected on the current lane, the two or more vehicles including the target vehicle.

8. The method according to claim 6, wherein the obtaining comprises:

applying the speed limit information of the current lane as the speed information of the current lane when only the target vehicle exists in the current lane.

9. The method according to claim 6, wherein the obtaining comprises:

ignoring other vehicles behind the target vehicle on the current lane when the other vehicles are detected.

10. The method according to claim 6, wherein the method further comprises:

performing a modification on the speed information of the current lane by multiplying the speed information of the current lane with an adjustment coefficient when three or more lanes exist and the current lane is a fast lane; and determining a second utility value of the current lane according to the modified speed information and the speed limit information of the current lane.

11. An apparatus for lane selection, comprising:
processing circuitry configured to obtain a decision model used for a lane change selection based on a first model configured to decide a junction lane change and associated with a mandatory lane change (MLC) and a second model configured to decide a travelling speed and associated with a discretionary lane change (DLC);

acquire, via interface circuitry of the apparatus, travelling information of a target vehicle and target information related to the target vehicle in real time, the target information being configured to represent travelling information of one or more vehicles around the target vehicle; and define a target lane from candidate lanes based on utility values of the candidate lanes that are calculated based on (i) the decision model, (ii) the target information related to the target vehicle and (iii) the travelling information of the target vehicle that is acquired in real time, wherein the utility values of the candidate lanes include MLC utility values of the candidate lanes and DLC utility values of the candidate lanes.

12. The apparatus according to claim 11, wherein processing circuitry is further configured to:

define a lane having a maximum utility value from the calculated utility values as the target lane.

13. The apparatus according to claim 12, wherein the candidate lanes comprise at least one of a current lane on which the target vehicle is currently travelling, a left lane with respect to the current lane, and a right lane with respect to the current lane, the left and right lanes being adjacent to the target vehicle.

14. The apparatus according to claim 13, wherein the processing circuitry is further configured to:

determine a respective first utility value for each of the candidate lanes, according to (i) a value of lane change times of the target vehicle, (ii) a distance from the target vehicle to a junction, and (iii) a minimum distance for each of lane changes of the target vehicle, the respective first utility value for each of the candidate lanes being related to the first model;

determine a respective second utility value for each of the candidate lanes, the respective second utility value for each of the candidate lanes being related to the second model, according to (i) speed information of the candidate lanes and (ii) speed limit information of the candidate lanes, the speed information of the candidate lanes providing a recommended speed limit to the target vehicle in the candidate lanes; and obtain a respective comprehensive utility value for each of the candidate lanes according to the respective first utility value and the respective second utility value for each of the candidate lanes.

15. The apparatus according to claim 14, before the determination of the respective first utility value for each of the candidate lanes, wherein the processing circuitry is further configured to:

determine a first candidate lane from the candidate lanes according to a road network condition, the road network condition including the junction and a subsequent road connected to the junction; and obtain a first value of lane change times of the target vehicle according to a first distance between the current lane on which the target vehicle is currently travelling and the first candidate lane in a first direction, the first direction being perpendicular to the current lane and the first candidate lane;

obtain the distance from the target vehicle to the junction according to a second distance between a location of the current lane on which the target vehicle is currently located and the junction in a second direction, the second direction being parallel to the current lane; and obtain, according to a current speed and an estimated lane change time of the target vehicle, the minimum distance for each of the lane changes.

16. The apparatus according to claim 14, before determination of the respective second utility value for each of the candidate lanes, wherein the processing circuitry is further configured to:

calculate and adjust a speed of the target vehicle in real time according to speed information of the one or more vehicles around the target vehicle; and obtain the speed information of the current lane according to a preset rule when a vertical distance from a center point of the target vehicle to a center line is less than a threshold value.

17. The apparatus according to claim 16, wherein the processing circuitry is further configured to:

apply a minimum speed of two or more vehicles in the current lane as the speed information of the current lane when the two or more vehicles are detected on the current lane, the two or more vehicles including the target vehicle.

18. The apparatus according to claim 16, wherein the processing circuitry is further configured to:

apply the speed limit information of the current lane as the speed information of the current lane when only the target vehicle exists in the current lane.

19. The apparatus according to claim 16, wherein the processing circuitry is further configured to:

perform a modification on the speed information of the current lane by multiplying the speed information of the current lane with an adjustment coefficient when three of more lanes exist and the current lane is a fast lane; and determine a second utility value of the current lane according to the modified speed information and the speed limit information of the current lane.

20. A non-transitory computer readable storage medium storing instructions which when executed by at least one processor cause the at least one processor to perform:

obtaining a decision model used for a lane change selection based on a first model configured to decide a junction lane change and associated with a mandatory lane change (MLC) and a second model configured to decide a travelling speed and associated with a discretionary lane change (DLC);

acquiring travelling information of a target vehicle and target information related to the target vehicle in real time, the target information being configured to represent travelling information of one or more vehicles around the target vehicle; and defining a target lane from candidate lanes based on utility values of the candidate lanes that are calculated based on (i) the decision model, (ii) the target information related to the target vehicle and (iii) the travelling information of the target vehicle that is acquired in real time, wherein the utility values of the candidate lanes include MLC utility values of the candidate lanes and DLC utility values of the candidate lanes.

* * * * *